(12) United States Patent
Deal

(10) Patent No.: US 6,891,294 B1
(45) Date of Patent: May 10, 2005

(54) ELECTRIC MOTOR VEHICLE COMPRISING SAME

(76) Inventor: Clarence D. Deal, 14000 N. Choctaw Rd., Jones, OK (US) 73049

( * ) Notice: Subject to any disclaimer, the term of this patent is extended or adjusted under 35 U.S.C. 154(b) by 33 days.

(21) Appl. No.: 10/643,199

(22) Filed: Aug. 18, 2003

(51) Int. Cl.$^7$ .............................................. H02K 21/00
(52) U.S. Cl. ........................ 310/152; 290/45; 180/65.8; 318/773; 318/775; 318/777
(58) Field of Search ............................... 310/152, 67 R, 310/254, 258, 259, 261, 266, 268; 290/45; 180/65.1–65.5, 65.8; 318/767, 772–777

(56) References Cited

U.S. PATENT DOCUMENTS

| | | | |
|---|---|---|---|
| 3,282,632 A | 11/1966 | Arsem ......................... | 327/398 |
| 3,355,584 A | * 11/1967 | Daughman .............. | 246/187 B |
| 3,439,189 A | 4/1969 | Petry ........................... | 327/465 |
| 3,489,923 A | 1/1970 | Dahele ........................ | 327/503 |
| 3,548,965 A | 12/1970 | Pierro ......................... | 180/65.5 |
| 3,590,339 A | 6/1971 | Irwin et al. ................. | 257/159 |
| 3,694,670 A | 9/1972 | Marzolf ...................... | 327/475 |
| 3,803,466 A | * 4/1974 | Starkey ....................... | 104/292 |
| 3,902,565 A | 9/1975 | Farrall ........................ | 180/651 |
| 4,107,551 A | 8/1978 | Akamatsu ................... | 327/440 |
| 4,315,171 A | * 2/1982 | Schaeffer ................... | 310/49 R |
| 4,532,460 A | * 7/1985 | Gale et al. .................. | 318/139 |
| 4,644,242 A | * 2/1987 | Takata et al. ............... | 318/771 |
| 4,958,287 A | 9/1990 | Sugimura et al. ............. | 701/62 |
| 4,969,103 A | 11/1990 | Maekawa ..................... | 701/96 |
| 5,143,037 A | 9/1992 | Sawamoto .................. | 123/3.99 |
| 5,195,470 A | 3/1993 | Ikeura ........................ | 123/90.5 |
| 5,786,645 A | * 7/1998 | Obidniak ................... | 310/68 R |
| 5,796,194 A | * 8/1998 | Archer et al. ............. | 310/68 B |
| 6,049,153 A | 4/2000 | Nishiyama et al. .... | 310/156.53 |
| 6,356,001 B1 | 3/2002 | Nishiyama et al. .... | 310/156.53 |
| 6,390,215 B1 | 5/2002 | Kodama et al. ........... | 180/65.3 |
| 6,404,151 B1 | 6/2002 | Bader ........................... | 378/39 |
| 6,552,460 B2 * | 4/2003 | Bales .................... | 310/156.35 |
| 6,633,151 B2 * | 10/2003 | Johnson ...................... | 318/801 |

* cited by examiner

Primary Examiner—Dang Le
(74) Attorney, Agent, or Firm—Mary M. Lee

(57) ABSTRACT

An electric motor for a motor vehicle or other machine. The motor includes a support member with electromagnets (coils) and a moving member with permanent magnets. The coils are divided into groups, each group having several sets of coils, each set having several coil units. Each coil has its own battery or other energy source. A drive circuit controls activation of the coils. At maximum power, all coils sets are energized together. At each lower power level, different groups of coil sets are operated, and a cycling circuit varies which of the groups are energized. In this way, energy drain on the batteries is evenly distributed, maximizing the operating time of the motor before recharging of the batteries is required. In one embodiment, the coils are turned on by SCRs, and transistors turn off the SCRs, providing a novel SCR turnoff circuit ideal for high voltage, low current applications.

90 Claims, 12 Drawing Sheets

ELECTRIC MOTOR VEHICLE COMPRISING SAME

FIELD OF THE INVENTION

The present invention relates to electric motors for motor vehicles and other machines.

BACKGROUND OF THE INVENTION

There is a continuing effort to make electric cars more practical in order to lessen our dependence on petroleum products and to reduce the deleterious impact on the environment when petroleum based fuels are burned. One of the main disadvantages of cars powered by conventional electric motors is the frequency with which the batteries must be recharged.

The operating period of a motor's battery is determined largely by the current required by the motor, so battery life could be optimized by using a low current motor. However, to be practical, electric cars must have relatively high power capacity. This means the motor must be high voltage in addition to low current, since power is proportional to the product of the voltage and the current.

Power is also proportional to the revolutions per minute ("RPM") times the torque. The RPM of an electric motor in a vehicle is relatively slow as compared to most other applications of electric motors. Thus, the torque in electric powered vehicle must be maximized.

The torque of an electric motor is directly proportional to the product of the number of turns in the coil and the current. Since there is need to minimize the current, the number of turns in the coil must be maximized in order to maximize torque.

On the other hand, there is a competing need to minimize the number of turns in the coil in order to minimize inductance, which is proportional to the number of turns squared. Low inductance is needed to maximize the speed at which the coil reverses polarity, which in turn maximizes the speed of the motor.

It is apparent, then, that the goal of maximizing high torque competes with the goal maximizing the speed of the motor in vehicular applications. The electric motor of the present invention utilizes multiple electromagnets and multiple batteries along with multiple permanent magnets to extend battery life without compromising speed or power. This electric motor provides the ideal combination for an electric motor vehicle: low current and high voltage.

SUMMARY OF THE INVENTION

The present invention is directed to an electric motor. The motor comprises a support member and a moving member. Also included is a plurality of electromagnet groups, each group comprising at least one electromagnet set. Each electromagnet set comprises a plurality of electromagnet units, and each of the electromagnet units comprises at least one coil around a core having two poles. Each coil has first and second terminals. The electromagnet units are fixed on the support member and connectable to an energy source. Adjacent electromagnet units are spaced equal distances apart on the support member. Preferably, the number of electromagnet units is a factor of 360.

A plurality of permanent magnets is supported on the moving member so that during operation of the motor at least some are positioned a magnetically responsive distance from the plurality of electromagnet units on the support member. Each of the permanent magnets has a north pole and a south pole, and each is alternatingly oriented relative to adjacent permanent magnets so that adjacent poles of adjacent permanent magnets have alternating polarity. Adjacent permanent magnets are spaced equal distances apart on the moving member. Preferably, the number of permanent magnets is an even number.

The motor includes a drive circuit comprising a sequencing circuit, a power control circuit, an integration circuit and coil operating circuits. The sequencing circuit produces a plurality of sequencing outputs adapted to sequentially activate each of the plurality of electromagnet units in each of the electromagnet sets, whereby the moving member is caused to move relative to the support member.

The power control circuit is adapted to control the power generated by the motor by activating selected electromagnet groups. The power control circuit has a plurality of incremental power modes comprising a maximum power mode and at least one nonmaximum power mode. In the maximum power mode all the electromagnet groups are activated. In the at least one nonmaximum power mode a selected number of the electromagnet groups less than all the groups is activated.

The power control circuit comprises a power selector having a plurality of power mode outputs corresponding to the maximum power mode and the at least one nonmaximum power mode. In addition, the power control circuit has a cycling circuit having a plurality of cycling outputs adapted to vary which of the plurality of electromagnet groups are activated by the sequencing circuit when the motor is operating in the at least one nonmaximum power mode without varying the number of groups being activated.

The integration circuit is adapted to integrate the sequencing outputs and the cycling outputs to produce a coil control output corresponding to each of the electromagnet units. The coil operating circuits are adapted to control the activation of each coil in each electromagnet unit in response to the coil control output.

Still further, the present invention comprises a circuit for controlling electrical current supplied to a load from a first energy source. The circuit is usable with a pulsed signal source and a second energy source. Both the first and second energy sources have positive and negative terminals, and the positive terminal of the first energy source is connected to the negative terminal of the second energy source. The load has an input and an output, and the output of the load is connected to the negative terminal of the first energy source.

The circuit comprises an SCR having an anode, a cathode and a gate. The anode is connectable to the positive terminal of the first energy source, and the cathode is connectable to the input of the load. A leading edge detector is included, and it has an input and an output. The input of the leading edge detector is connectable to the pulsed signal source, and the output is connected to the gate of the SCR.

Another component of the circuit is a transistor having a base, and emitter and a collector. The collector is connected to the positive terminal of the second energy source, and the emitter is connectable to the output of the SCR. Also included in the circuit is trailing edge detector having an input and an output. The input is connectable to the signal source, and the output is connected to the base of the transistor.

Upon detection by the leading edge detector of the leading edge of the pulsed signal, the leading edge detector turns on the SCR energizing the load. Upon detection by the trailing edge detector of the trailing edge of the pulsed signal, the trailing edge detector energizes the transistor, which turns off the SCR and de-energizes the load.

DETAILED DESCRIPTION OF THE PREFERRED EMBODIMENT(S)

The Embodiment of FIGS. 1–10

Figure 1:
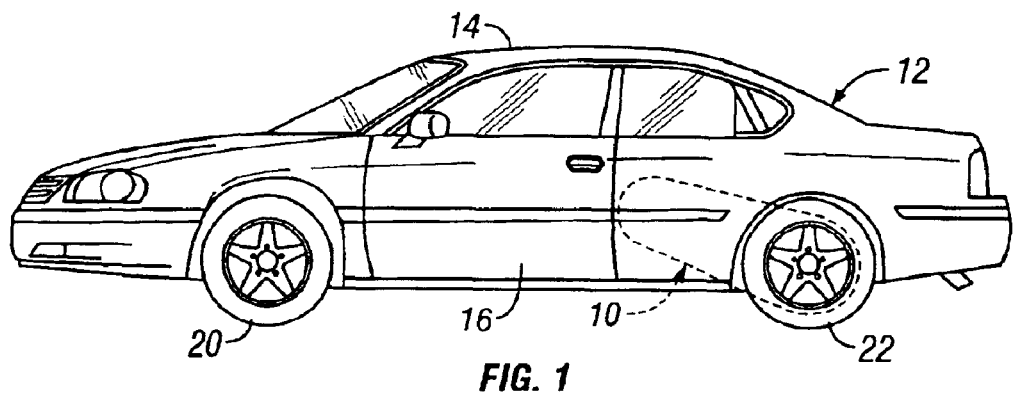
FIG. 1 is a side elevational view of a vehicle equipped with the electric motor of the present invention, the motor drivingly mounted to the rear axle.
Figure 2:
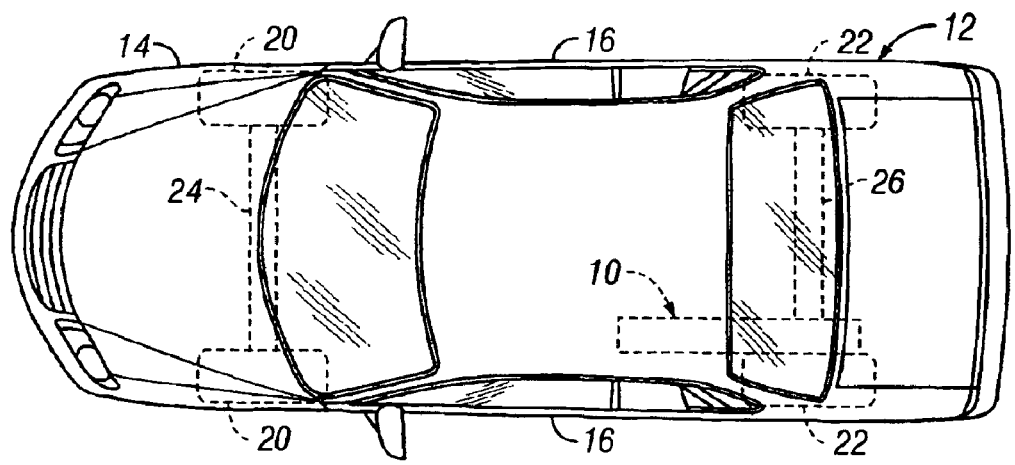
FIG. 2 is a plan view of the vehicle shown in FIG. 1.

With reference now to the drawings in general and to FIGS. 1 and 2 in particular, there is shown therein, in phantom, an electric motor constructed in accordance with the present invention and designated by the reference numeral 10. The electric motor 10 is shown installed in a motor vehicle 12, as this is, an ideal application for this motor. However, it will become apparent that this motor will have many other uses, such as industrial belt drive applications, which will benefit from its low current, high voltage characteristics.

The vehicle 12 generally comprises a chassis 14, the design of which will vary greatly depending on the intended use of the vehicle. In the embodiment shown, the vehicle 12 comprises a typical passenger sedan. However, the vehicle may be of any type. It may be a truck, sedan, wagon, sport utility vehicle, or sport coupe. It may not even be a passenger vehicle. In the present embodiment, the chassis 14 includes two pivotally mounted side doors designated collectively by the reference numeral 16. In another embodiment not shown herein, the vehicle is a passenger sedan but the entrance is a door pivotally mounted across the front of the chassis or the rear or both. This is a preferred arrangement since the front end of the vehicle will no longer be occupied by the large gasoline engine found in conventional motor vehicles.

In an otherwise conventional manner, the vehicle 12 further comprises two front wheels 20 and two rear wheels 22 supported on a front axle 24 and a rear axle 26, respectively. The front and rear axles 24 and 26 are movingly and rotatingly supported on the chassis 14. In a manner described in more detail hereafter, the motor 10 is drivingly connected to the rear axle 26 whereby operation of the motor will rotate the axle and motivate the vehicle 12. Of course, in other applications, it may be preferable to connect the motor to the front axle, or two both axles. Alternately, the motor may actually form the wheel itself, as is explained herein. In some cases, more than one motor may be utilized in a single vehicle. For example, two motors could be applied to the rear axle of a vehicle, one motor on each of the front and rear axles. These and other changes are encompassed in the present invention.

Figure 3:
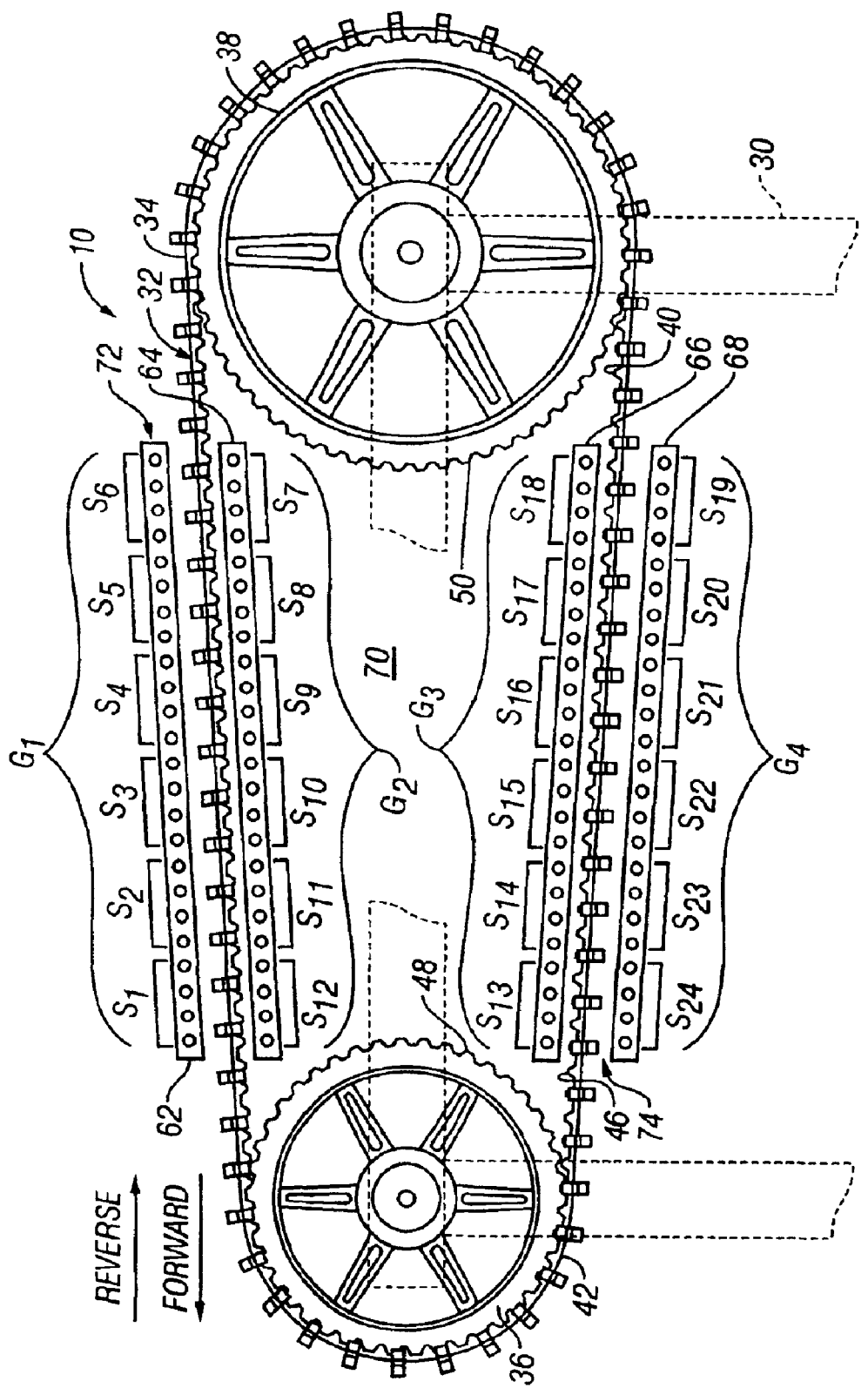
FIG. 3 is a side elevational, semi-schematic view of a first preferred embodiment of the motor of the present invention comprising an endless belt supported on two wheels with a tray of electromagnets above and below the belt on the top and bottom sections between the wheels.

Turning now to FIG. 3, a first embodiment of the electric motor 10 will be described. The motor 10 comprises a supporting frame 30 of some sort, shown only in phantom as its precise configuration is inconsequential. The frame 30, of course, will be mounted inside the chassis 14 in a suitable manner, which need not be described in detail herein.

The motor 10 preferably further comprises a moving member 32. As shown in FIG. 2, the moving member 32 comprises an endless belt 34. The belt 34 is drivingly supported on a pair of wheels, including a first wheel 36 and as second wheel 38. The belt has an inner surface 40 and an outer surface 42. As seen also in FIG. 4, the central section 44 of the inner surface 40 of the belt 34 may be provided with transverse treads 46 to match corresponding treads 48 and 50 on the wheels 36 and 38. In this way, the central section 44 of the belt is adapted to drivingly engage the wheels 36 and 38. Both of the wheels 36 and 38 are mounted rotatably to the frame 30 by axles and bearings not shown in detail. One of the wheels, preferably the larger wheel 38 is drivingly engaged with the rear axle 26 of the vehicle 12 (FIGS. 1 and 2). Thus, when the motor 10 rotates the rear wheel 38, the rear axle 26 and the wheels 22 supported on it are rotated propelling the vehicle 12. It will be appreciated that there are numerous other arrangements which would permit the rotational power of the motor 10 to be communicated to the vehicle 12.

Figure 4:
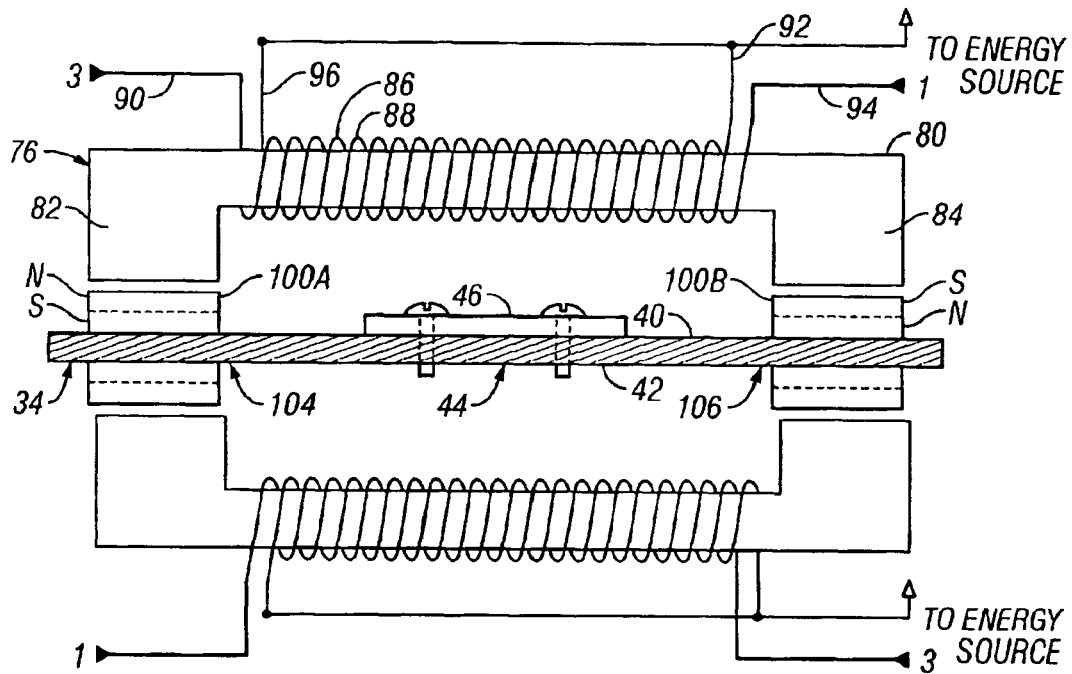
FIG. 4 is an enlarged, sectional view taken through one section of the endless belt and the two trays of electromagnets above and below it.

With continuing reference to FIGS. 3 and 4, the electric motor 10 further comprises a support member 60 fixed to the chassis 14 or the frame 30 for supporting the electromagnets, described hereafter. The support member 60 may take many forms. In this embodiment, the support member comprises a plurality of trays, including a first tray 62, a second tray 64, a third tray 66 and a fourth tray 68. The trays 62, 64, 66 and 68 preferably are nonmovably fixed to the frame 30 by vertical braces (not shown), although other support means may be employed. The trays in the embodiment shown here are simple rectangular frames adequate to support the electromagnet units, as explained hereafter. The trays may take various forms and thus are not shown or described in detail herein.

When viewed as in FIG. 3, it will be seen that the endless belt 34 supported on the two spaced-apart wheels 36 and 38 includes an operating area 70 generally between the two wheels. In the upper section 72 of the operating area 70, the belt 34 passes above and between the wheels 36 and 38. In the lower section 74, the belt 34 passes below and between the wheels 36 and 38. The first tray 62 is supported in the upper section 72 immediately above the belt; the second tray 64 is supported in the upper section 72 immediately below the belt. Similarly, the third tray 66 is supported in the lower section 74 immediately above the belt; the fourth tray 68 is supported in the lower section 74 immediately below the belt.

With continuing reference to FIGS. 3 and 4, the electric motor 10 further comprises a plurality of electromagnets. Preferably, the electromagnets are divided into a plurality of groups. In the embodiment shown in FIGS. 3 and 4, the electromagnets are divided into four (4) groups including a first group, a second group, a third group and a fourth group, designated in the drawings as $G_1$, $G_2$, $G_3$, and $G_4$. In this embodiment, the first group $G_1$ is supported in the first tray 62, the second group $G_2$ is supported in the second tray 64, the third group $G_3$ is supported in the third tray 66, and the fourth group $G_4$ is supported in the fourth tray 68.

Each electromagnet group preferably comprises at least one electromagnet set and more preferably a plurality of electromagnet sets. In the embodiment shown in FIGS. 3–5, each group of electromagnets comprises six (6) sets of electromagnets. Most preferably, the first group $G_1$ comprises 6 sets of electromagnets $S_1$–$S_6$, the second group $G_2$ comprises 6 sets of electromagnets $S_7$–$S_{12}$, the third group $G_3$ comprises 6 sets of electromagnets $S_{13}$–$S_{18}$, and the fourth group $G_4$ comprises 6 sets of electromagnets $S_{19}$–$S_{24}$.

Each electromagnet set $S_1$–$S_{24}$ preferably comprises a plurality of electromagnet units designated generally by the reference numeral 76. In the embodiment shown, each of the electromagnet sets comprises four (4) electromagnet units. The total number of electromagnet units may vary widely depending on the application. In the preferred practice of this invention, the number of electromagnet units is a factor of 360.

A preferred design for an electromagnet unit 76 is shown in FIG. 4. As in most applications all the electromagnet units will be identically formed, only one unit will be described in detail herein. Preferably, each electromagnet unit 76 comprises at least one coil wound around a core 80 having two poles, or first and second poles 82 and 84. More preferably, each unit 76 comprises a pair of coils 86 and 88 double wound, or wound "two in hand."

The first coil 86 has a first terminal 90 and a second terminal 92, and the second coil 88 has a first terminal 94 and a second terminal 96. The first terminals 90 and 94 are connected to an input signal described hereafter. The second terminals 92 and 96 are connectable to an energy source as explained below. Now it will be apparent that when the coil 86 is energized, the pole 82 will be south and the pole 84 will be north, and when the coil 88 is energized, the pole 82 will be north and the pole 84 will south. Thus, the polarity of the poles can be reversed by selectively energizing the pair of coils 86 and 88.

Figure 5:
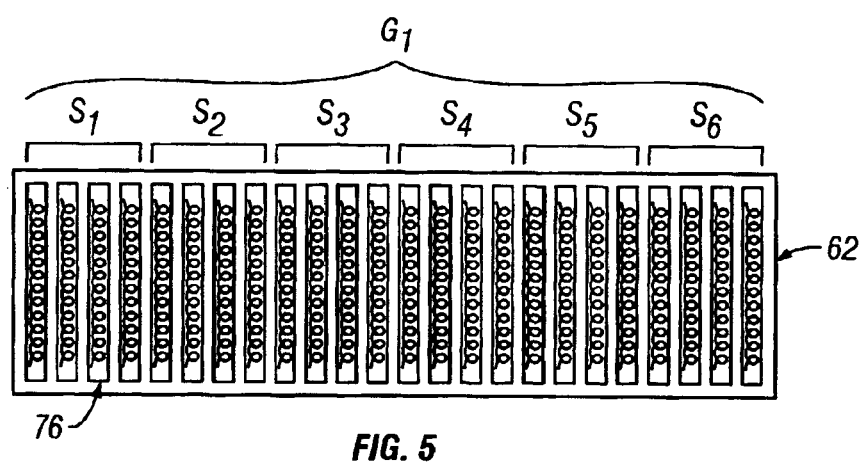
FIG. 5 is a plan view of one of the trays of electromagnets.

Referring still to FIGS. 1–4 and now also to FIG. 5, a preferred arrangement of electromagnet units on a tray is shown. As indicated, the electromagnet sets $S_1$–$S_6$ in the first group $G_1$ are supported on the first tray 62, and one preferred arrangement of these units is best seen in FIGS. 4 and 5. The units are positioned transversely on the tray 62 with the poles directed perpendicularly relative to the row of cores. As shown in FIG. 4, the poles are positioned to face the endless belt 34, so that the poles of the cores in the trays above the belt point downwardly and the poles of the cores below the belt point upwardly. The units in the groups $G_1$–$G_4$ all are arranged so that adjacent units are spaced equal distances apart in the trays 62, 64, 66 and 68, as illustrated by FIGS. 3 and 5.

Referring still to FIGS. 3–5, the electric motor 10 comprises a plurality of permanent magnets, designated collectively herein as 100. The particular type of permanent magnet utilized in this invention may vary widely. In the embodiment illustrated in FIGS. 3–5, the preferred permanent magnets are Neodymium. The total number of permanent magnets may vary widely depending on the application. In the preferred practice of this invention, the total number of permanent magnets is an even number.

The permanent magnets are supported on the moving member, such as the endless belt 34, so that during operation of the motor at least some are positioned a magnetically responsive distance from the electromagnet units in the trays 62, 64, 66 and 68.

In the embodiment shown in FIG. 3, the permanent magnets 100 are spaced evenly apart around the entire length of the belt 34. In this arrangement, only a limited number of the magnets 100 on the belt 34 are within a reactive distance from the electromagnet units 76. As the belt 34 rotates on the wheels 36 and 38, the magnets 100 are moving by the electromagnet units 76, so that at any one time some of the magnets 100 are within a magnetically responsive distance of the units and some are not. In other embodiments, the configuration of the moving member may be such that all magnets are within a magnetically responsive distance from the electromagnet units on the frame or other support member.

In the preferred arrangement, permanent magnets 100 are fixed to the inner and outer surfaces 40 and 42 of the belt 34 so that magnets are reactively positioned relative to the electromagnet units 76 in all four of the trays 62, 64, 66 and 68. To that end, as best seen in FIG. 4, the belt 34 is provided with first and second lateral sections 104 and 106 extending from the sides of the central section 44 carrying the treads 46 that engage the wheels 36 and 38.

The permanent magnets 100, when viewed along the belt lengthwise as seen in FIG. 3, are alternatingly oriented so that adjacent poles of adjacent magnets have alternating polarity. The preferred spacing of the magnets 100 is twice the distance between adjacent electromagnet units 76. That is, in the configuration shown, there is a permanent magnet spaced across from every other electromagnet unit. It will also be seen from the sectional view of FIG. 4, that the permanent magnets 100 are transversely aligned on opposing sides of the belt 34, such as the magnets 100A and 100B. As will become apparent, these aligned magnets 100A and 100B should be oppositely oriented in polarity. That is, if the upwardly facing pole of magnet 100A is north, then the upwardly facing pole on the magnet 100B should be south.

The position and operation of the permanent magnets 100 is best understood with reference to FIG. 4. Each magnet 100, such as the magnets 100A and 100B in FIG. 4, has a north pole "N" and a south pole "S". Accordingly, when the first coil 86 is energized, the pole 82 is south and will attract the north pole of the permanent magnet 100A and the pole 84 is north and will attract the south pole of the magnet 100B. When the second coil 88 is energized, the pole 82 is north and will repel the north pole of the permanent magnet 100A, and the pole 84 is south and will repel the south pole of the magnet 100B.

As will be explained in more detail hereafter, the coils in the electromagnet units will not be energized when the magnets are directly opposite them as shown in FIG. 4. Rather, the coils will be energized when the magnets are a step in front and behind the units, so as to push or pull the magnets in the selected direction. As the magnets are propelled, the endless belt 24 is pulled with them, which in turn rotates the wheels 36 and 38, providing the drive source for the vehicle 12 or other machine.

Figure 6:
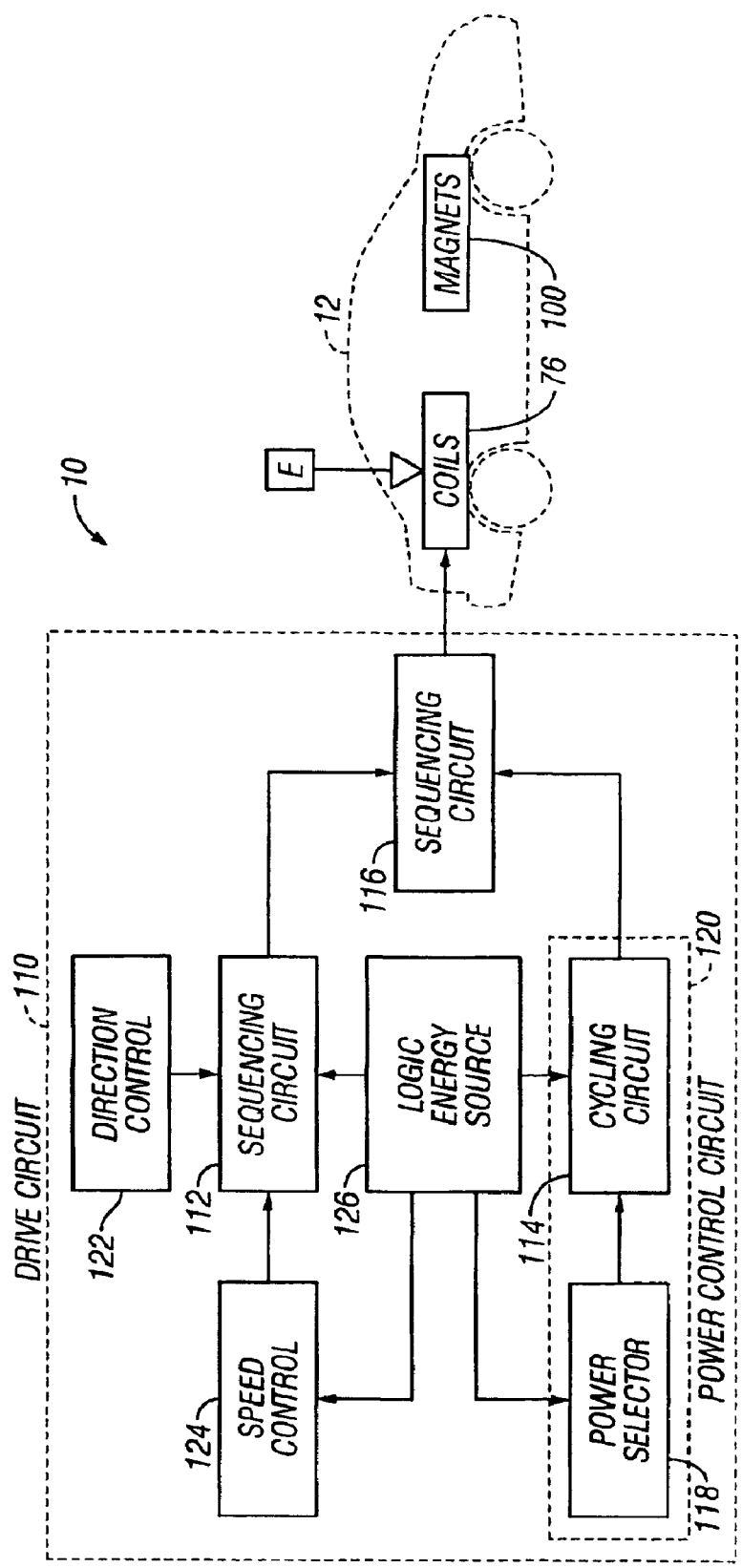
FIG. 6 is an illustrative arrangement of the circuitry of a preferred drive circuit for the motor of the present invention.

Turning now to FIG. 6, an overview of a preferred drive circuit for the electric motor of this invention will be provided. The drive circuit 110 preferably comprises a sequencing circuit 112 and a cycling circuit 114. The output of the sequencing circuit 112 and the cycling circuit 114 both are connected to an integration circuit 116. The output of the integration circuit 116 is connected to the input of the coils in the electromagnet units 76 in the vehicle 12. The cycling circuit 114 combined with the power selector 118 comprise a power control circuit 120. A direction control circuit 122 may be included to alternate the direction of the sequential activation of the electromagnet units 76 in each set $S_1$–$S_{24}$ to provide a forward and reverse direction for the motor 10, as in the case of a vehicle. A speed control circuit 124 may be included to vary the speed of the motor 10. The speed control circuit 124, power selector 118, cycling circuit 114, and the sequencing circuit 112 all may be powered by a single logic energy source 126. The logic energy source 126 preferably is a source of direct current, such as a battery or fuel cell.

The sequencing circuit 112 provides a plurality of sequencing outputs adapted to sequentially activate each of the plurality of electromagnet units 76 in each of the sets of electromagnet units $S_1$ to $S_{24}$. In this way, the endless belt 34 or other moving member is caused to move relative to the frame 30 or other support member.

The power control circuit 120 is adapted to control the power generated by the motor by activating selected electromagnet groups. This circuit has a plurality of incremental power modes comprising a maximum power mode and at least one nonmaximum power modes, such as low, medium and high. In the maximum power mode, all the electromagnet groups are activated, but in the nonmaximum power modes a selected number less than all the groups is activated.

The power selector 118 selects the power level—maximum, high, medium or low—and provides a power mode output corresponding to the selected power level. In response to the output of the power selector 118, the cycling circuit 114 provides a plurality of cycling outputs adapted to vary which of the plurality of electromagnet groups $G_1$–$G_4$ are activated by the sequencing circuit when the motor 10 is operating without varying the number of groups being activated.

For example, in the embodiment of FIGS. 1–5, there are four groups, $G_1$–$G_4$, and the preferred cycling circuit 114, described below, provides four (4) cycles. Thus, at maximum power all four groups are constantly energized in all four cycles. At high power, only three of the four groups $G_1$–$G_4$ are energized, but it is a different subset of groups in each cycle. Similarly, at medium power, only two of the four groups are energized in each cycle, but the particular two are different in each cycle. At low power, a different single group is energized in each cycle. This cycling through the electromagnet groups $G_1$–$G_4$ is illustrated in Table I below.

The integration circuit 116 is adapted to integrate the sequencing outputs from the sequencing circuit 112 and the cycling outputs from the cycling circuit 114 to produce a coil control output corresponding to each of the electromagnet units 100.

Figure 7:
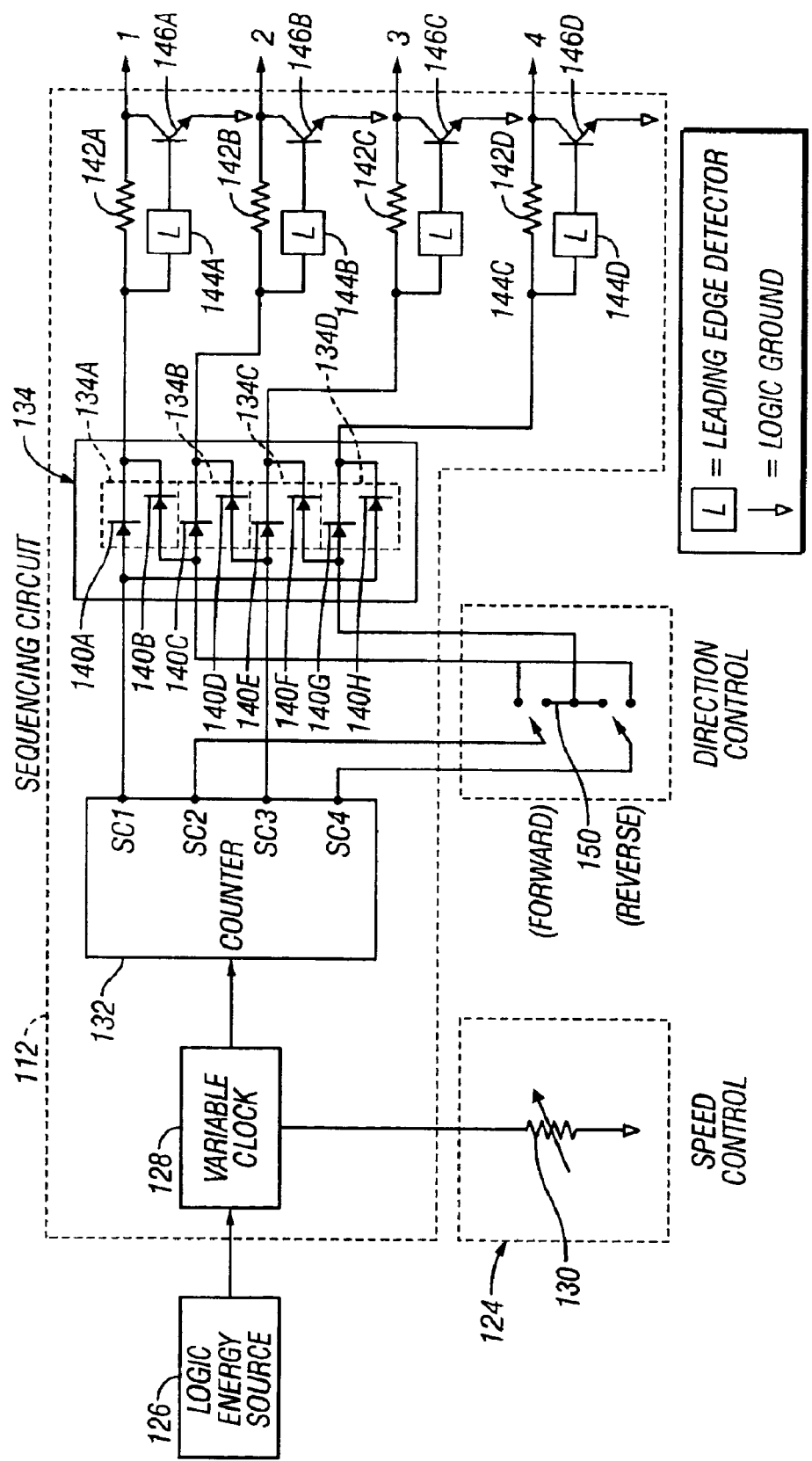
FIG. 7 is a schematic diagram of the sequencing and direction control circuits of the motor.

FIG. 7, to which attention is now directed, illustrates a preferred design for a sequencing circuit with speed and direction control. The sequencing circuit 112 comprises a variable clock 128 for providing an output in the form of an energy pulse. Where it is desired to have a motor with a variable speed, a speed control circuit 124 may be included to vary the frequency of the pulse emitted from the clock 128. A variable resistor 130 is shown here, but other devices may be substituted effectively, such as a capacitor or inductor. The power clock 128 is connectable to an energy source, such as the logic energy source 126.

The preferred sequencing circuit 112 preferably also includes a counter 132 adapted to receive the energy pulses from the power clock 130 and to produce sequential pulsed outputs corresponding to a selected one of the electromagnet units 76 in each electromagnet sets $S_1$–$S_{24}$. Since there are four units in each set, the counter 132 produces four (4) sequential outputs SC1, SC 2, SC3 and SC 4.

A matrix of OR gates 134, or their equivalents, is also included. The matrix of OR gates 134 in this embodiment may be four pairs of diodes 140A, 140B, 140C, 140D, 140E, 140F, 140G and 140H, forming OR gates 134A, 134B, 134C and 134D. The OR gates 134A–D are adapted to receive the sequential outputs of the counter 132 and to sustain the pulse from each sequential output for the duration of two clock pulses, for a reason to be explained. To that end, the output "SC1" from the counter 132 is connected to the input of first and eighth diodes 140A and 104H in the OR gates 134A and 134D, respectively; the output "SC2" from the counter is connected to the input of the second and third diodes 140C and 104D of the first and second OR gates 134A and 134B, respectively; the output "SC 3" from the counter is connected to the input of the fourth and fifth diodes 140D and 104E, of the second and third OR gates 134B and 134C, respectively; the output "SC 4" from the counter is connected to the inputs of the sixth and seventh diodes 140F and 104G of the third and fourth OR gates 134C and 134D, respectively.

When arranged thusly, there will be an output from the first and fourth OR gates every time the counter 132 emits a signal at SC1. There will be an output from the first and second OR gates every time the counter emits a signal at SC2. There will be an output from the second and third OR gates every time the counter emits a signal at SC3. Finally, there will be an output from the third and fourth OR gates every time the counter emits a signal at SC4.

The output of the first OR gate 134A is connected to the input of a resistor 142A and to the input of a Leading Edge Detector ("LED") 144A. The output of the second OR gate is connected to the input of a resistor 142B and to the input of an LED 144B. The output of the third OR gate is

TABLE I

|  | CYCLE 1 | CYCLE 2 | CYCLE 3 | CYCLE 4 |
| --- | --- | --- | --- | --- |
| MAXIMUM | $G_1, G_2, G_3, G_4$ | $G_1, G_2, G_3, G_4$ | $G_1, G_2, G_3, G_4$ | $G_1, G_2, G_3, G_4$ |
| HIGH | $G_1, G_2, G_3$ | $G_2, G_3, G_4$ | $G_1, G_3, G_4$ | $G_1, G_2, G_4$ |
| MEDIUM | $G_1, G_2$ | $G_2, G_3$ | $G_3, G_4$ | $G_1, G_4$ |
| LOW | $G_1$ | $G_2$ | $G_3$ | $G_4$ | connected to the input of a resistor 142C and to the input of an LED 144C. The output of the fourth OR gate 134D is connected to the input of a resistor 142D and to the input of an LED 144D.

Now it will be understood that the sequencing outputs SC1–4 will have the duration of two pulse periods from the clock. Moreover, due to the overlapping arrangement of the diodes 140A–G, the "on" periods of sequencing output will overlap the "on" period of the next sequencing output, as will be explained below in more detail.

The sequencing circuit 112 also preferably includes a time delay circuit adapted to momentarily deactivate each electromagnet unit when it is directly opposite a permanent magnet. To that end, the outputs of the OR gate matrix 134 are further processed as follows: the output of the LED 144A is connected to the input or base of an NPN transistor 146A, and the output or collector of the transistor 146A is connected to the output of the resistor 142A producing sequencing output "1".

The output of the LED 142B is connected to the base of a transistor 146B, and the collector of the transistor 146B is connected to the output of the resistor 142B producing sequencing output "2". The output of the LED 144C is connected to the base of a transistor 146C, and the collector of the transistor 146C is connected to the output of the resistor 142C producing sequencing output "3". The output of the LED 144D is connected to the base of a transistor 146D, and the collector of the transistor 146D is connected to the output of the resistor 142D producing sequencing output "4". The LED's 144A–D, in combination with the transistors 146A–D, provide sequential, momentary "off" intervals for each output as desired. In each of the transistors, the emitter is connected to logic ground, indicated by the downwardly extending, hollow arrow.

In this circuit, then, the LED's 144A–D turn on the transistors 146A–D, which will temporarily short out the signal output from the resistors 142A–D, respectively, when a pulse is generated. In this way, the activation signals being output from the sequencing circuit 112 for the electromagnet units 76 are temporarily interrupted for a purpose explained more fully below.

With continuing reference to FIG. 7, the direction control circuit 122 may vary widely, but a simple switch device can be provided conveniently by interposing a double pole, double throw switch 150 between the counter 132 and the OR gate matrix 134. More specifically, counter output "SC2" is connected to input of the first pole of the switch 150, and counter output "SC4" is connected to the second pole. The first position of the first pole and the second position of the second pole of the switch 150 are connected to the input of the second and third diodes 140B and 140C. The second position of the first pole and the first position of the second pole are connected to the input of the sixth and seventh diodes 104F and 104G.

The switch 150 in FIG. 7 is shown in the "forward" condition, that is, in this condition the output sequence of the counter, and thus the sequencing circuit 112, will be in the order SC1, SC 2, SC 3, SC 4. In the "reverse" position, the switch 150 will cause the order of the counter outputs to be SC1, SC4, SC3, SC2. Thus, the direction control switch 150 is adapted to alternate the direction of the sequential activation of the electromagnet units in each set $S_1$–$S_{24}$ between a first or forward direction and a second or reverse direction.

Figure 8:
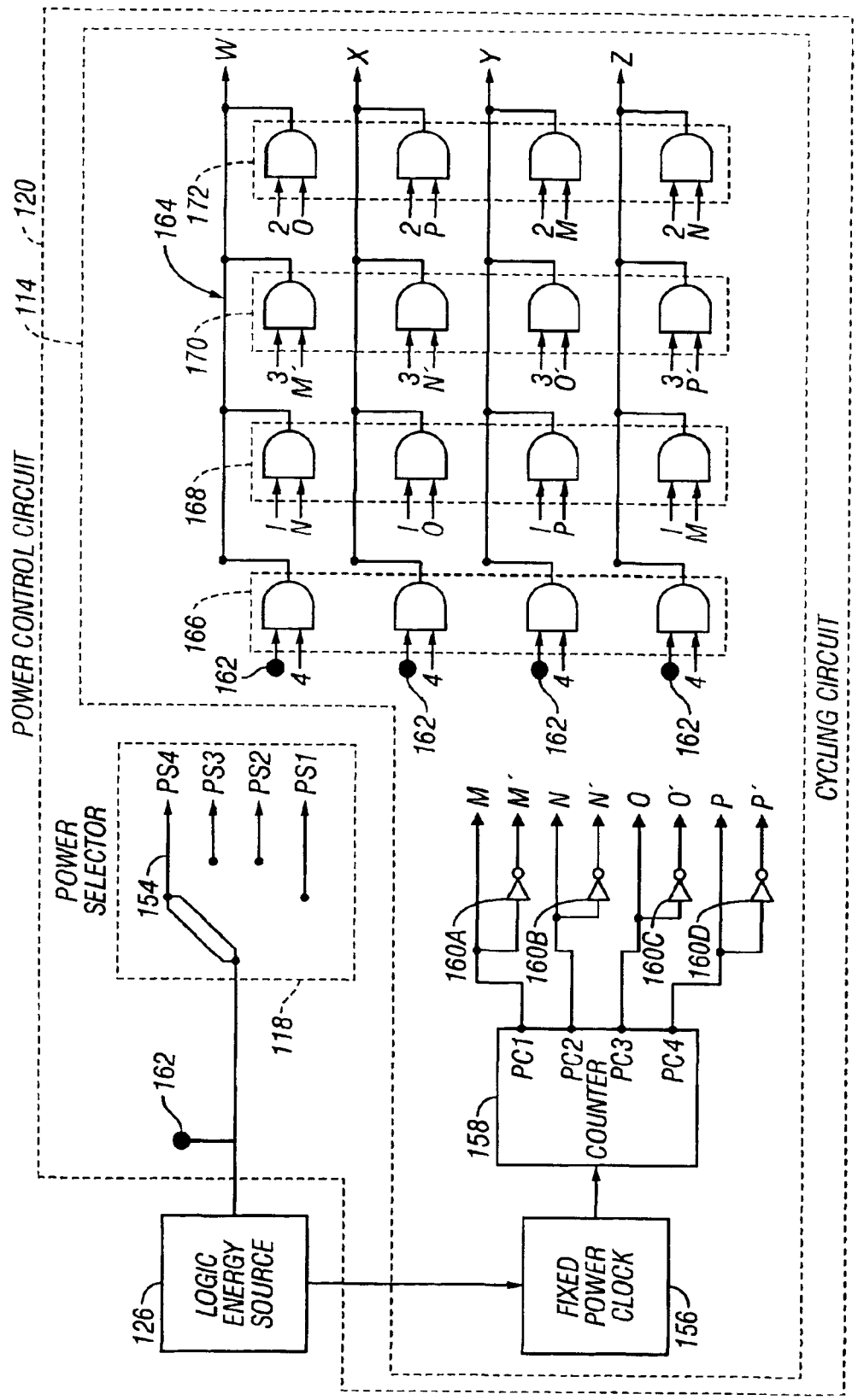
FIG. 8 is a schematic diagram of the power control and cycling circuit of the motor.

Reference now is made to FIG. 8, in which an exemplary power control circuit is illustrated. As previously explained, the power selector 118 is adapted to select from several power levels, preferably including maximum, high, medium and low. A preferred device for this is a single-throw, four pole switch 154, as shown in FIG. 4, with one of the four pole positions designated for each of the several power modes. That is, PS1 corresponds to low power, PS2 corresponds to medium power, PS3 corresponds to high power, and PS4 corresponds to maximum power. The input of the power switch 154 is connected to the logic energy source 126. The output of the power switch 154 is fed to the cycling circuit 120.

The cycling circuit 120 preferably comprises a power clock 156 connectable to an energy source, such as the logic energy source 126. The power clock 156 is adapted to produce energy pulses to drive the cycling circuit 120. The power clock 156 shown is a fixed power clock, but this is not essential.

The output of the clock 156 is connected to the input of a counter 158 which provides sequential outputs. The number of outputs will depend on the number of groups of electromagnet sets. In this embodiment, there are four (4) groups $G_1$ to $G_4$. Consequently, the counter 158 is selected to produce four sequential outputs PC1, PC2, PC3 & PC4.

The counter 158 is adapted to produce an inverse signal for each of the direct signals or outputs PC1–4. To that end, each of the four outputs PC1–4 of the counter 158 also is input to an inverter 160A, 160B, 160C and 160D, respectively, to produce an inverse output for every pulse. Thus, the counter 158 outputs four sets of signals that are designated herein arbitrarily as M, M', N, N', O, O', P and P'. In other words, each output produces a direct and reverse signal for each pulse corresponding to each of the groups $G_1$ to $G_4$.

The preferred cycling circuit 114 further comprises a matrix of AND gates 164 adapted to receive the power mode outputs of the power selector switch 158 and the on and off output signals from the counter 158 to produce a cycling output signal for each of the electromagnet groups. Since the embodiment of the present motor 10 includes four electromagnet groups, the AND gate matrix 164 produces four signals designated arbitrarily herein as "W," "X," "Y," and "Z."

The first column 166 of AND gates in the matrix 164 controls the operation of the cycling circuit in the maximum power mode. This column includes four gates, each of which receives one input directly from the logic energy source 126 as indicated at 162. The other input to each of the AND gates is from the output of the "maximum" position PS4 of the power selector switch 154. Thus, when the power switch 154 is turned to the fourth or maximum terminal, there will be an "on" signal for all of the groups W, X, Y and Z, unaffected by the outputs of the counter 158. However, when the power switch 154 is turned to any other position, the AND gates in this first column will output no signal or an "off" condition.

The second column 168 of AND gates control the operation of the cycling circuit in the low power mode. This column includes four gates, each of which receives one input from the PS1 position of the power switch 154. The other input to these AND gates is from one of the direct outputs from the counter 154, that is, from the counter outputs N, O, P and M, respectively. Accordingly, with each pulse of the clock 158, there will be an "on" output in only one of the AND gates in the second column, and the other gates in this column will be "off."

The third column 170 of AND gates include four gates that receive one input from position PS3, or the "high"

position of the power switch 154, and one from each of the inverse outputs from the counter 158, that is M', N', O' and P', respectively. Thus, when the switch 154 is set to "high," these AND gates will output a signal as the W, X, Y and Z outputs every time they coincidentally receive a pulse from the counter 158.

The fourth column 172 of AND gates include four gates that receive one input from position PS2, or the "medium" terminal of the power switch 154, and one from each of the direct outputs from the counter 158, that is O, P, M and N, respectively. Thus, when the switch 154 is set to "medium," these AND gates output an "on" signal to the W, X, Y and Z outputs every time they coincidentally receiver a pulse from the counter 158.

Thus configured, the cycling circuit 114 will output one of the cycling signals at W, X, Y and Z, as shown in Table II below.

TABLE II

| | Switch Position & Counter Output |
|---|---|
| W is "ON" | 4; 1 + N; 3 + M'; and 2 + O |
| X is "ON" | 4; 1 + O; 3 + N'; and 2 + P |
| Y is "ON" | 4; 1 + P; 3 + O'; and 2 + M |
| Z is "ON" | 4; 1 + M; 3 + P'; and 2 + N |

Figure 9:
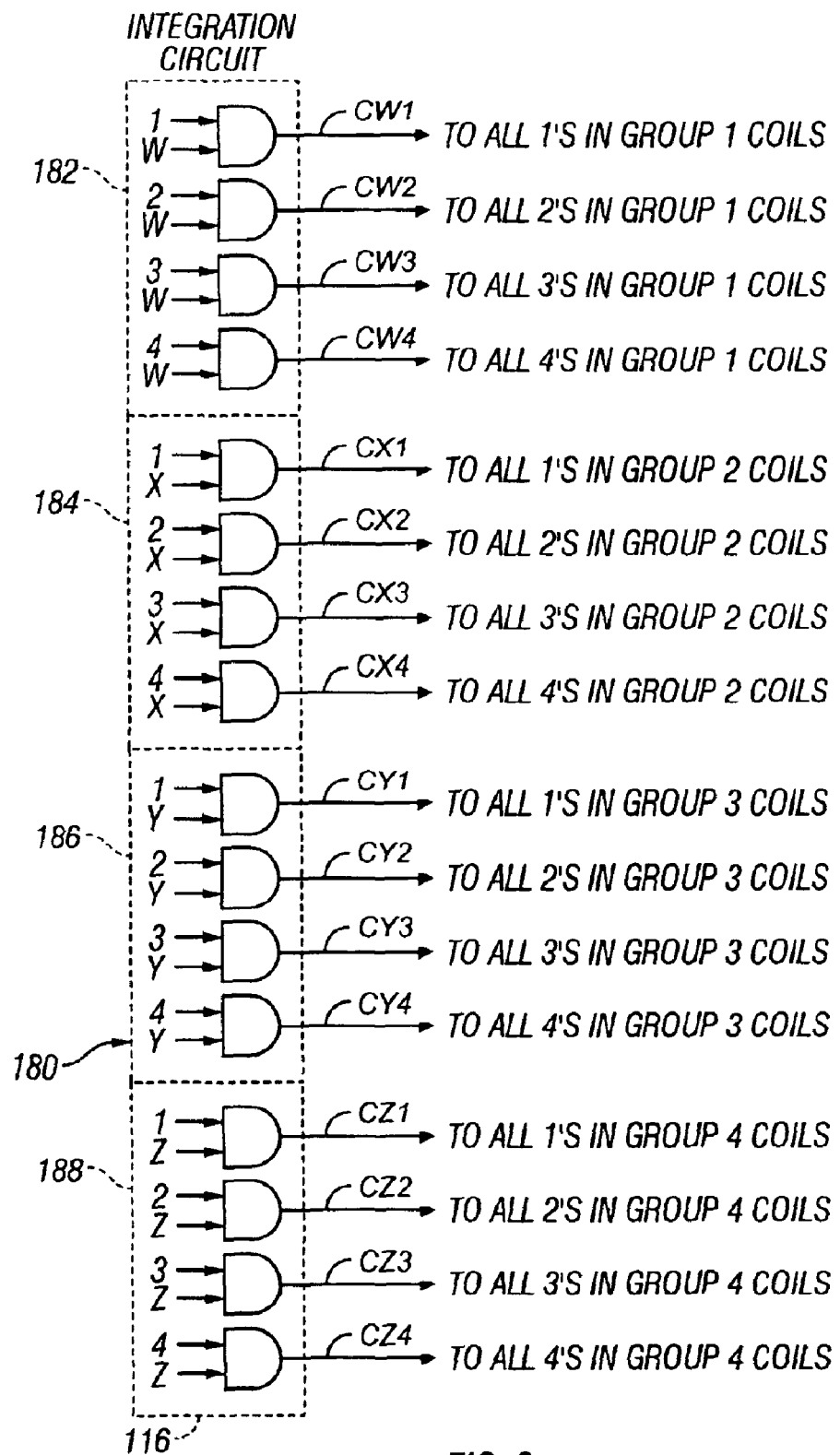
FIG. 9 is a schematic diagram of the integration circuit of the motor.

Attention now is directed to FIG. 9 for a description of a preferred integration circuit 116. In this embodiment, the integration circuit 116 comprises a matrix of AND gates 180, considered in four tiers 182, 184, 186 and 188.

The first tier 182 of AND gates comprises four gates. One input of each of these four gates is the W output from the cycling circuit 114 (FIG. 8). The second input to these four gates is one of the outputs 1, 2, 3 and 4, respectively, of the sequencing circuit 112 (FIG. 7). In response to the input of these signals, the AND gates in this first tier 182 produce a coil control output adapted to control the activation of all the electromagnet units 76 in the first group $G_1$ or "W." More specifically, the outputs CW1–4 of the AND gates in the first tier 182 are connected to the inputs of coil operating circuits, described hereafter, for the electromagnet units in each of the sets $S_1$–$S_6$ in group $G_1$.

The second tier 184 of AND gates comprises four gates, each of which receives one input as the X output from the cycling circuit 114 (FIG. 8). The second input is connected to the sequential outputs of the sequencing circuit 112 (FIG. 7). The outputs of the AND gates CX1–4 in the second tier 184 units are connected to the coil operating circuit inputs for pair 1, pair 2, pair 3 and pair 4, respectively, in all the sets $S_7$–$S_{12}$ in group $G_2$ or "X."

The third tier 186 of AND gates comprises four gates, each of which receives one input as the Y output from the cycling circuit 114 (FIG. 8). The second input is connected to the sequential outputs of the sequencing circuit 112 (FIG. 7). The outputs CY1–4 of the AND gates in the third tier 186 units are connected to the coil operating circuit inputs for pair 1, pair 2, pair 3 and pair 4, respectively, in all the Sets $S_{13}$–$S_{18}$ in group $G_3$.

The fourth tier 188 of AND gates comprises four gates each of which receives one input as the Z output from the cycling circuit 114 (FIG. 8). The second input is connected to the outputs of the sequencing circuit 112 (FIG. 7). The outputs CZ1–4 of the AND gates in the fourth tier 188 units are connected to the coil operating circuit inputs for pair 1, pair 2, pair 3 and pair 4, respectively, in all the sets $S_{19}$–$S_{24}$ in group $G_4$.

Figure 10:
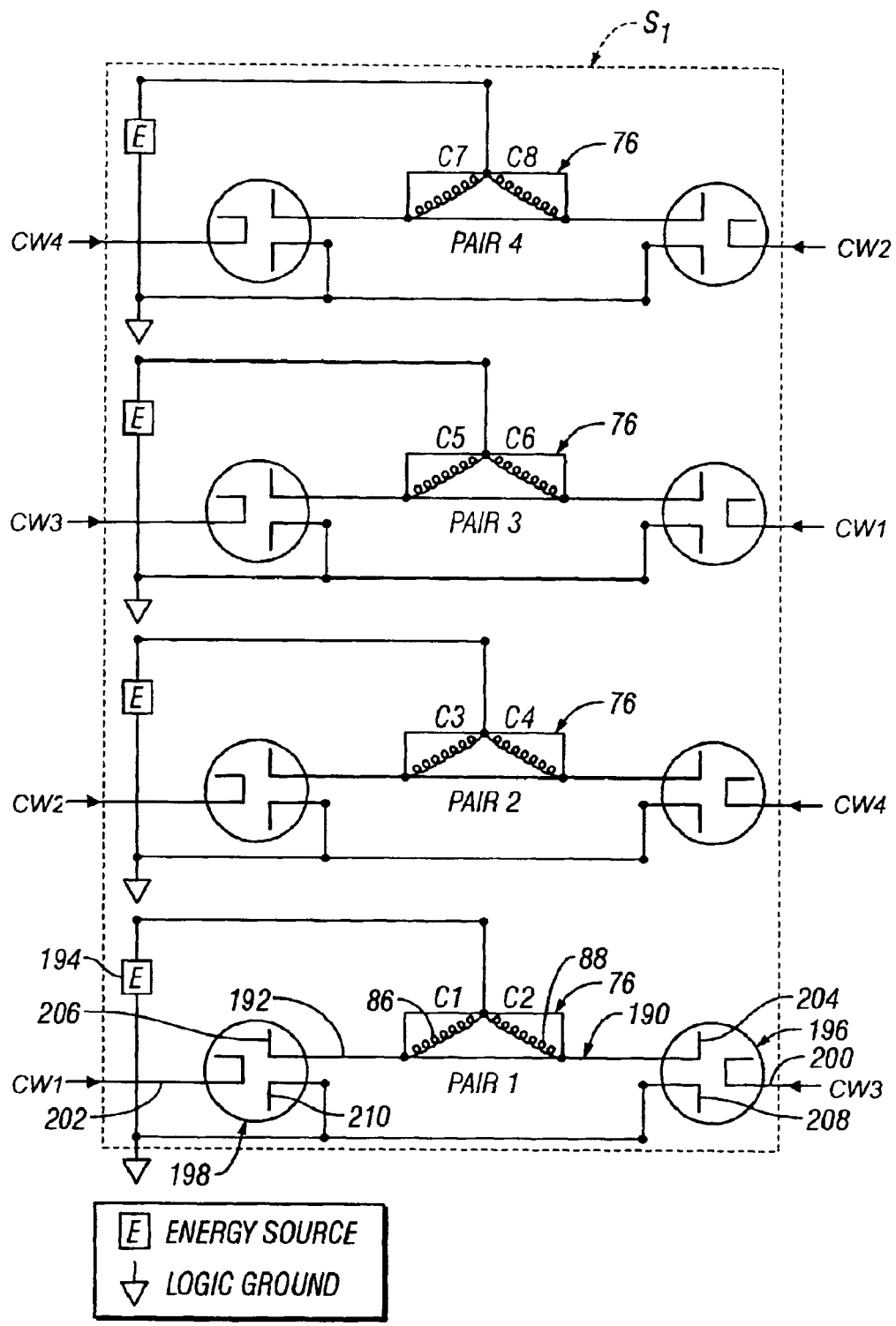
FIG. 10 is a schematic diagram of the one embodiment of a coil control circuit for the motor.

Referring now to FIG. 10, a first preferred coil operating circuit will be described. In this embodiment, each coil in each coil pair or electromagnet unit 76 is provided with its own coil operating circuit, and all the sets of electromagnets are similarly designed. Therefore, only one electromagnet set $S_1$ will described herein.

The electromagnet units 76 in FIG. 10 are shown only schematically, a more detailed showing of each unit being found in FIG. 4, discussed previously. Pair 1 comprises the coils 86 and 88 (see FIG. 4) each with a coil operating circuit 190 and 192. The second terminal of each coil 86 and 88 is connected to the positive terminal of an energy source 194, there being a separate energy source for each coil pair. Preferably, the energy source 194 is a battery or a fuel cell. For example, either a 6-volt battery or a low voltage fuel cell is suitable.

Each coil operating circuit 190 and 192 preferably includes a MOSFET 196 and 198, respectively, for turning the coil off and on. The input of each MOSFET is connected to one of the coil control outputs of the integration circuit 180 (FIG. 9). Since the electromagnet set shown in this drawing is $S_1$ in group $G_1$, the input 200 of the MOSFET 196 is connected to the coil control output CW3 from the third gate in the first tier 182 of gates in the AND gate matrix 180 of the integration circuit 116 (FIG. 9). The input 202 of the MOSFET 198 is connected to the coil control output CW1 from the first gate in the first tier 182 of gates in the AND gate matrix 180.

The first output 204 of the MOSFET 196 is connected to the first terminal of the coil 88, and the first output 206 of the MOSFET 198 is connected to the first terminal of the coil 86. The second outputs 208 and 210 of the MOSFET's 196 and 198 are connected to logic ground and to the energy source ground, the energy source ground and the logic ground being the same.

Referring still to FIG. 10, it will be seen that the coils in coil pair 2 connected to the outputs CW4 and CW2 from the integration circuit 116. Coil pair 3 is connected to the CW1 and CW3 outputs as is coil pair 1, but in reverse arrangement. Coil pair 4 is connected to the CW1 and CW4 outputs from the integration circuit 116, but in reverse arrangement relative to pair 3.

Figure 11A:
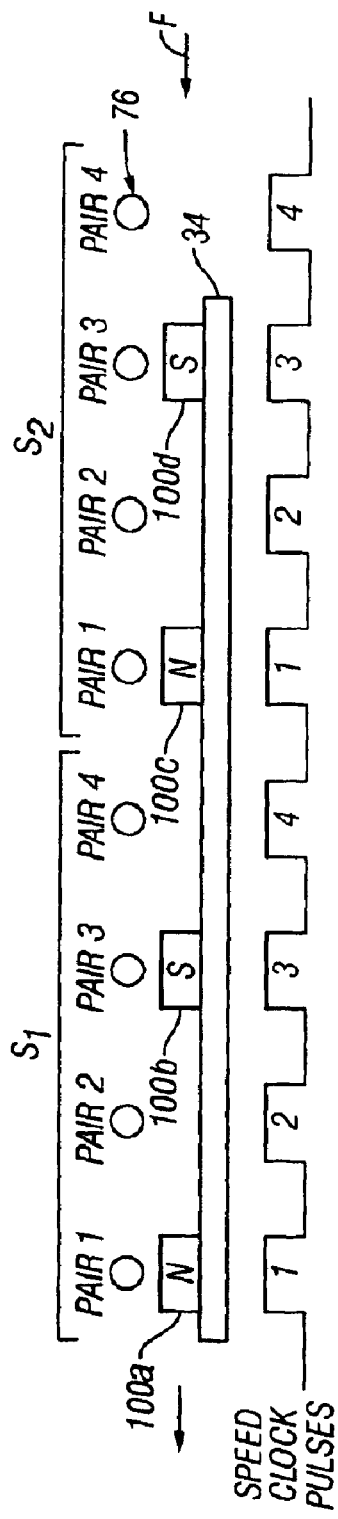
FIGS. 11A and 11B are schematic illustrations of the operation of the pulses from the sequencing circuit on the operation of the coils.
Figure 11B:
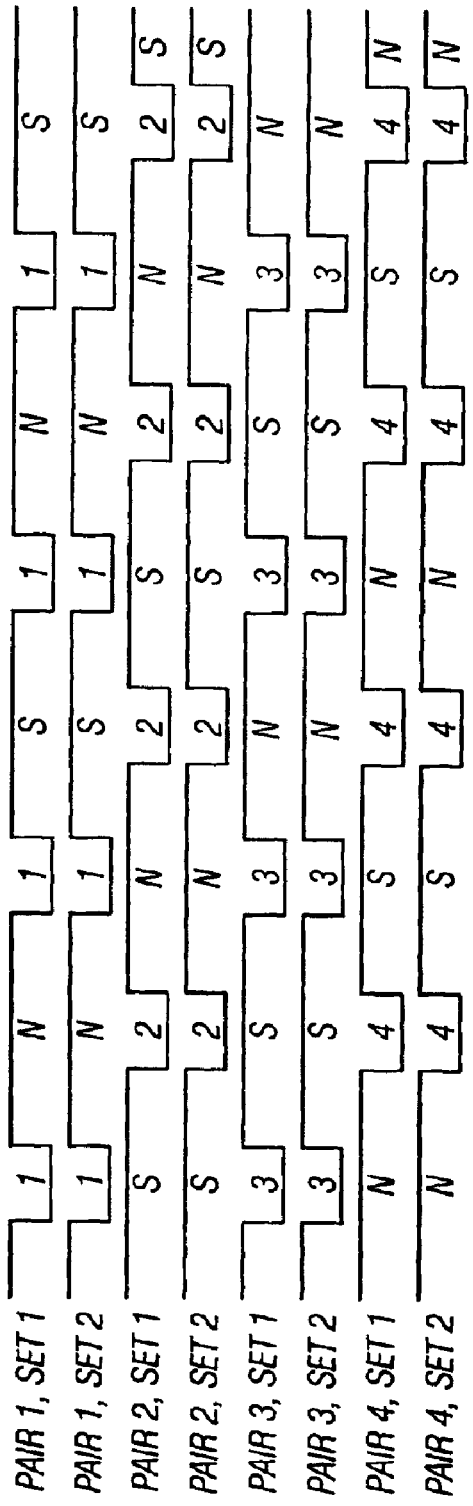

The operation of these coils is illustrated schematically in FIGS. 11A and 11B, to which reference now is made. FIG. 11A shows the magnets 100a, 100b, 100c and 100d schematically, having north, south, north, south alternating polarities as indicated. The magnets 100a–d are mounted on the endless belt 34, shown also only schematically in this Figure. Supported above the magnets 100a–d are the first two sets $S_1$ and $S_2$ of the electromagnet units 76, including pairs 1–4 in each set. The coil pairs 1–4 are shown directly opposite every other one of the magnets 100a–d, though it will be understood that, in operation, the magnets are continuously moving past the coil pairs. The direction of travel of the endless belt 34 on which the magnets 100a–d are mounted is indicated at "F" for forward. The pattern of the speed clock pulses from the counter 132 in the sequencing circuit 112 is shown beneath the endless belt 34 in FIG. 11 A.

FIG. 11B illustrates, also schematically, the pattern of activation of the electromagnet units 76 in the first two sets $S_1$ and $S_2$. When the integration circuit 116 (FIG. 9) outputs the "1" signal in response to the first pulse, coil pairs 1 and 3 are simultaneously energized, but with opposite polarity, pair one being north "N" and pair 3 being south "S". Thus, the polarities of the coil pairs are opposite to the polarities of the permanent magnets 100a–d directly opposite them in FIG. 11A. With the second pulse, coil pairs 2 and 4 are energized with opposite polarity, coil pair 2 being north and pair 3 being south. When the third pulse is emitted and coil control output "3" is received from the integration circuit 116, coil pairs 1 and 3 are simultaneously energized again, but with opposite polarity, so that now pair 1 is south and pair 3 is north. With the fourth pulse, coil pairs 2 and 4 are again energized with their polarities reversed relative to the second pulse.

As illustrated in FIG. 11B, the coil pairs are energized and remain energized with the same polarity a duration of two pulse periods (See FIG. 11A). The extended activation period results from the overlapping OR gate arrangement in the sequencing circuit 112 described previously (FIG. 7). Note also the brief "off" condition when each coil pair is directly opposite the permanent magnets 100a–d, as shown in the FIG. 11A. Now it will be apparent that this "off" period is necessary to avoid attracting a magnet when it is opposite the coil, and is accomplished by the time delay circuit shown in FIG. 7.

For example, pair 1 is off momentarily until the magnet 100a is just forward of it. Then, as the magnet 100a passes it, coil pair 1 becomes north in response to the first pulse/coil output signal, so that it will push magnet 100a further forward in the direction "F." During the same pulse, coil pair 3 is south and starts to repel passing magnet 10b. With the second pulse, coil pair 2 becomes north and coil pair 4 becomes south to attract approaching magnets 100b and 100c, respectively. This process repeats continuously while the motor 10 is operating. When the direction control switch 150 is changed to "reverse," the coil pairs are energized in the reverse pattern causing the belt 34 to move in the direction opposite to the direction "F" in 11A.

Figure 12:
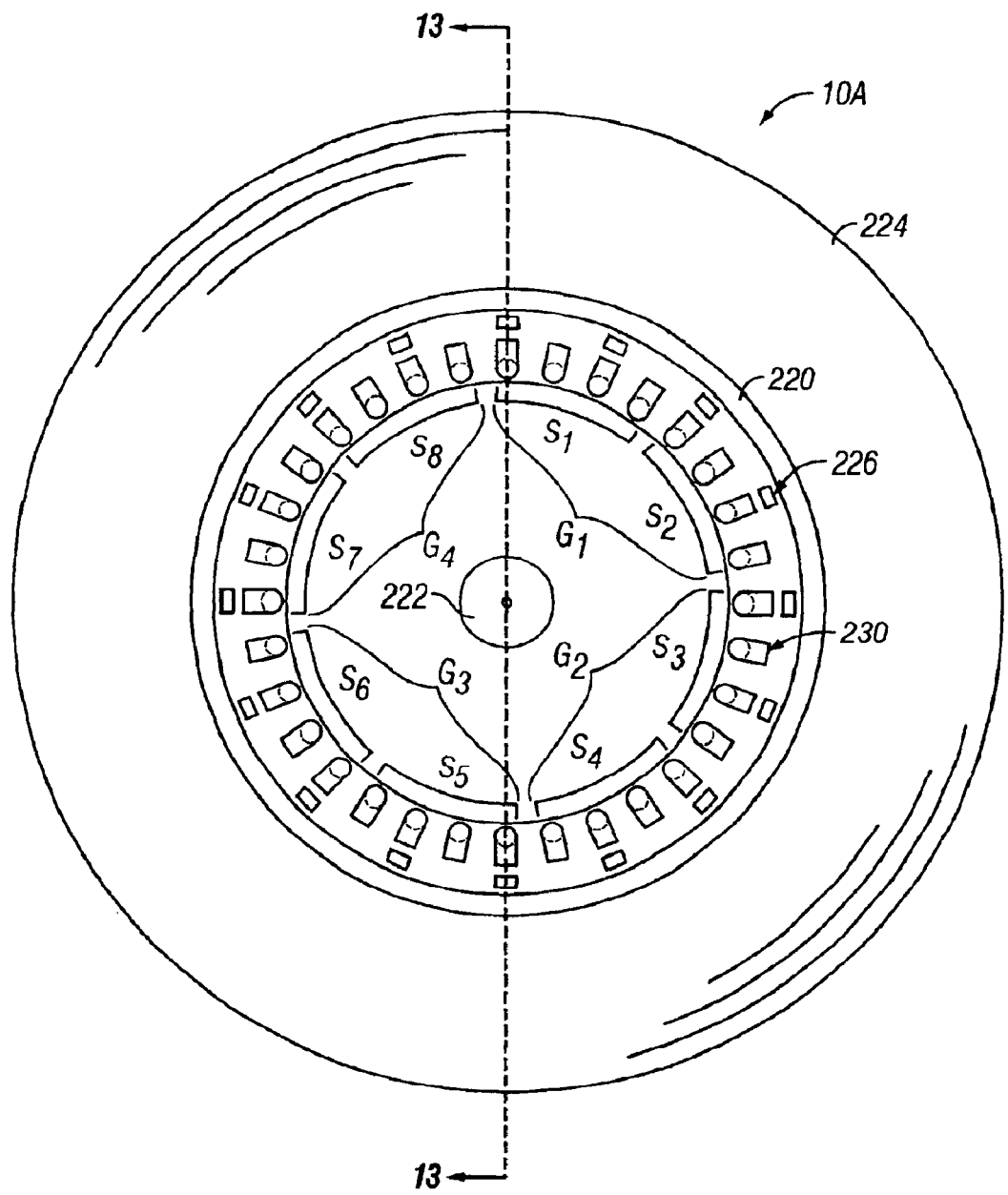
FIG. 12 is a side elevational, semi-schematic view of a second preferred embodiment of the motor of the present invention comprising a rotor and a stator, the rotor comprising a wheel on which a vehicle tire is mounted.
Figure 13:
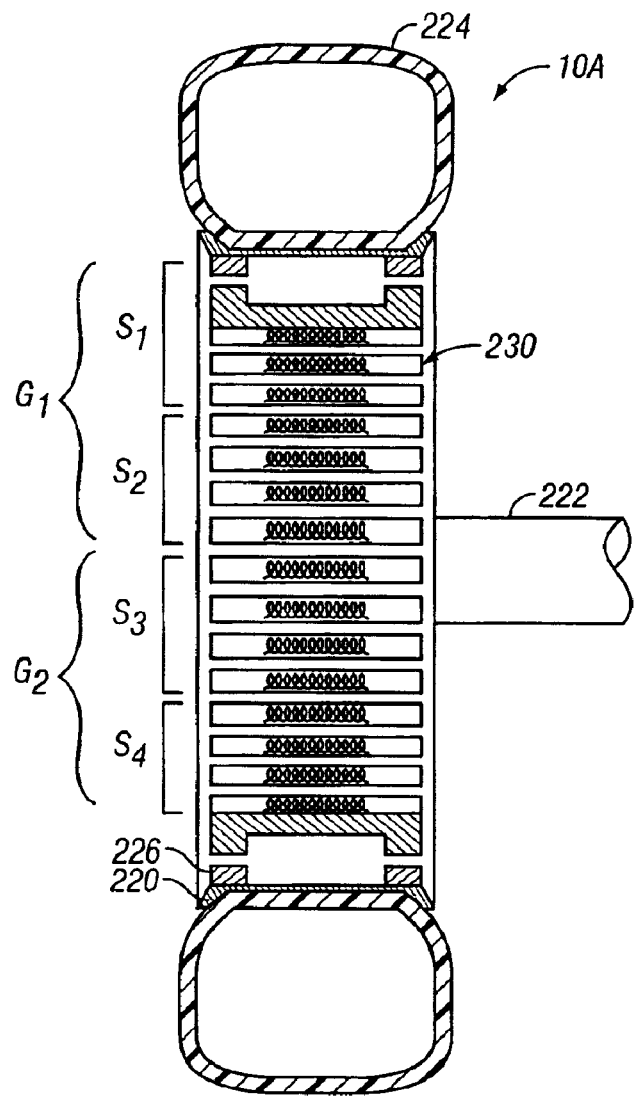
FIG. 13 is a sectional view taken along line 13—13 of FIG. 12.
Figure 14:
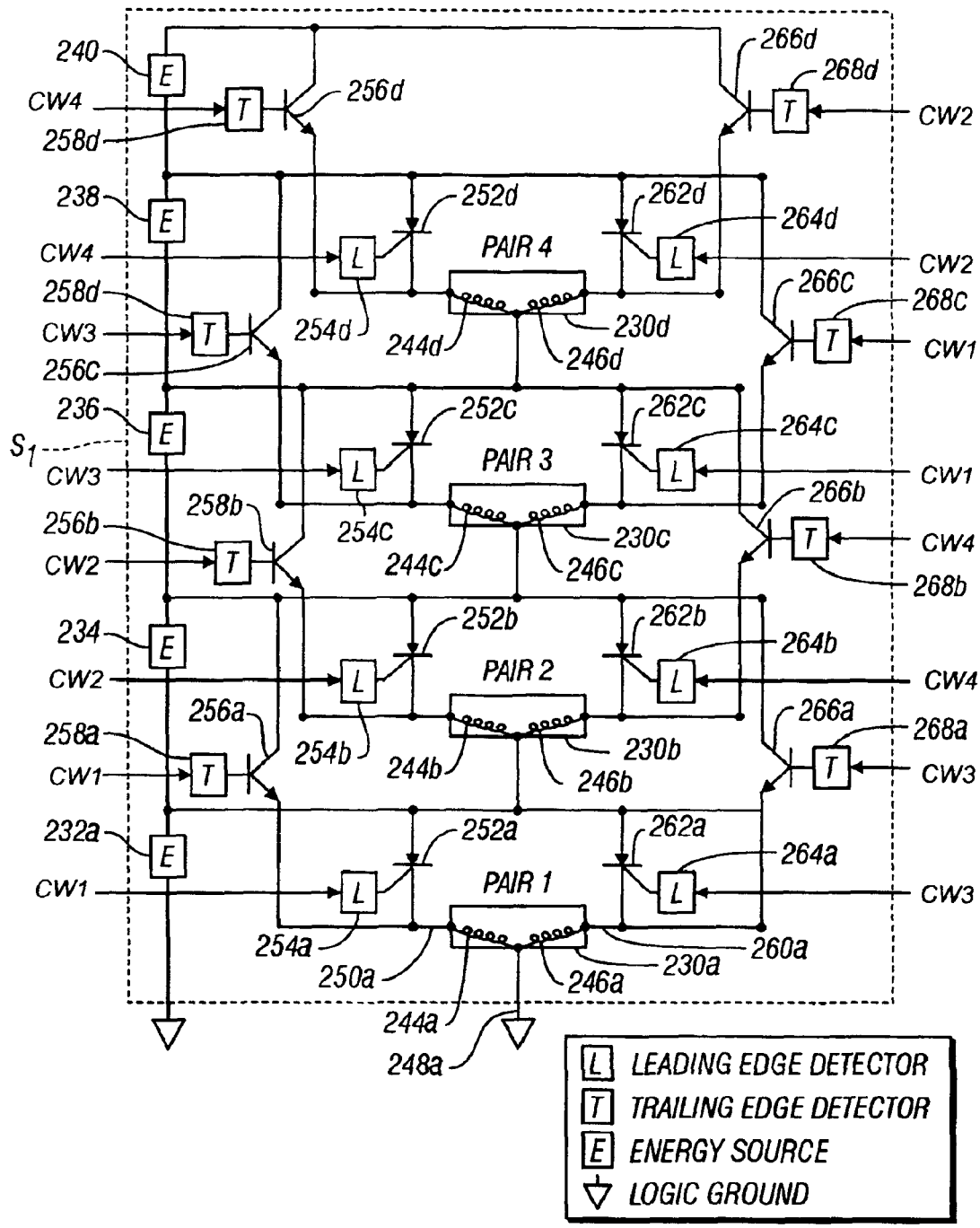
FIG. 14 is a second embodiment of a coil control circuit for use with the motor shown in FIG. 12.

The Embodiment of FIGS. 12–14

Shown in FIGS. 12 and 13 is another preferred embodiment for the motor of the present invention, designated generally herein as 10A. In this embodiment the motor is incorporated into the wheel of the vehicle 12. As shown best in FIG. 13, the permanent magnets are supported on moving member in the form of a rotor 220 rotatably supported on stationary axle 222 (FIG. 13) by a bearing assembly (not shown). The axle 222 is fixed to the chassis 14 of the vehicle 12 in some suitable manner. A tire 224 can be directly supported on the outside of the rotor 220.

A plurality of permanent magnets 226 are fixed to the inside of the rotor 220. In this embodiment there are 16 magnets 226, though the number may vary. These magnets may be similar to the type used in the previous embodiment. Preferably, as shown in FIGS. 12 and 13, the rotor 220 supports the permanent magnets 226 further from the axis of rotation of the rotor, indicated at "X," than are the electromagnet units 230.

For supporting the electromagnets a nonconductive support member in the form of a stator 228 is provided. The stator 228 supports a plurality of electromagnet units 230, which may be identical to the units 76 described previously. In this embodiment there are also four groups of electromagnet units, designated also as $G_1$ to $G_4$. However, in this embodiment there are only two sets of electromagnets in each group, designated herein as $S_1$–$S_8$. Each set has four electromagnet units, as did the sets in the previous embodiment.

The motor 10A comprises a drive circuit which may be similar to the drive circuit described above providing coil control outputs for energizing the electromagnet units 230. However, the coil control circuit included in the motor 10 (FIGS. 1–11, because it uses MOSFET's, is power limited. In high to moderate current applications, the present invention contemplates the use of silicon controlled rectifiers ("SCR's") to turn on the coils instead of MOSFET's.

Thus, while a similar coil control circuit to the circuits 190 and 192 may be employed in this embodiment, another preferred design using SCR's will be described with reference to FIG. 14. FIG. 14 illustrates set $S_1$ of the sets of electromagnet units 230 comprising individual units designated as 230A, 230B, 230C and 230D. In this preferred embodiment, each electromagnet unit is provided with its own energy source. In addition, each electromagnet set comprises one additional energy source. In this embodiment, then, there are five separate energy sources. Preferably, the energy sources are batteries or fuel cells. For example, five 6-volt batteries 232, 234, 236, 238 and 240 (or low voltage fuel cells) will serve. These five batteries are connected in series, the positive terminal of the first battery 232 connected to the negative terminal of the second battery, and so forth. The negative terminal of the first battery 232 is connected to logic ground.

The unit 230A comprises two coils 244a and 246a like the coils 86 and 88 of the first embodiment (FIG. 10). The second terminals of the coils 244a and 246a both are connected to logic ground at 248a. The first terminal 250a of the first coil 244a is connected to the positive terminal of the first battery 232. Connected in series between the first battery 232 and the first terminal 250a is an SCR 252a. The gate of the SCR is connected to the output of a leading edge detector "LED" 254a. The input of the LED 254a is connected to the output CW1 of the integration circuit 116 (FIG. 9).

The first terminal 250a of the coil 244a is also connected to the positive terminal of the second battery 234 with a transistor 256a connected in series therebetween. The emitter of the transistor 256a connects to the output of the SCR 252a, and the collector connects to the positive terminal of the second battery 234. The base of the transistor 256a is connected to the output of a trailing edge detector "TED" 258a, and the input of the TED is connected to the output of the signal CW1 of the integration circuit 116.

The first terminal 260a of the second coil 246 is connected to the positive terminal of the first battery 232. Connected in series therebetween is an SCR 262a, and the gate of the SCR is connected to the output of an LED 264a. The input of the LED 264a is connected to the output signal CW3 of the integration circuit 116.

A transistor 266a is connected in series between the positive terminal of the second battery 234 and the output of the SCR 262a. The base of the transistor 266a is connected to the output of a TED 268a, and the input of the TED is connected to the output CW3 of the integration circuit 116.

When a pulse CW1 is received from the integration circuit 116 into the LED 254a and the TED 258a, the LED detects the leading edge and emits a signal to turn on the SCR 252a. This permits the first coil 244a to be energized. The trailing edge of the pulse is detected by the TED 258a, which then turns on the transistor 256a. Because the voltage through the transistor 256a is higher than the voltage into the SCR, this higher reverse voltage (about 12 volts from the two 6-volt batteries in series) is sufficient to turn off the SCR 252a, thus deactivating the first coil 244a. In this way, the coil control output signal CW1 from the integration circuit 116 energizes the coil 244a for the duration of two pulses from clock 128 in the sequencing circuit 112 less the momentary off period while the coil is immediately opposite a magnet.

As shown in FIG. 14, each of the coil pairs 2–3 is provided with a coil operating circuit similar to the coil operating circuits of the pair 1 coils. Accordingly, coils 244b, 244c and 244d are provided with SCR's 252b, 252c and 252d, LED's 254b, 254c and 254d, transistors 256b, 256c and 256d, and TED's 258b, 258c and 258d, respectively. Similarly, coils 246b, 246c and 246d are provided with SCR's 262b, 262c and 262d, LED's 264b, 264c and 264d, transistors 266b, 266c and 266d, and TED's 268b, 268c and 268d, respectively. In this way, the voltage input to the transistor in each circuit is the product of two batteries in series while the voltage input to the SCR in that circuit is from only one battery. The transistors can handle this high voltage easily because it is of such short duration, typically only about ten (10) microseconds.

Figure 15:
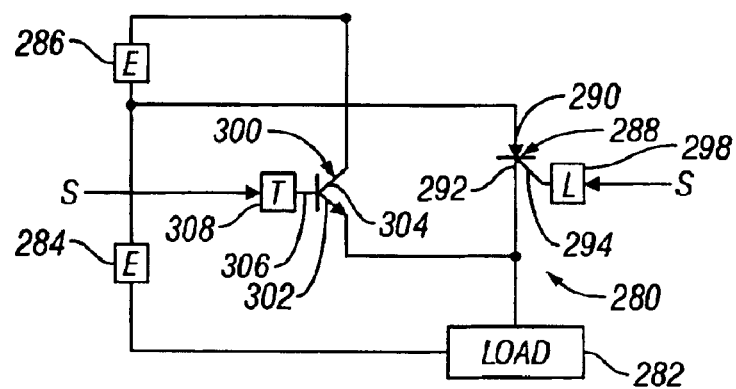
FIG. 15 is a schematic diagram showing a circuit for turning an SCR on and off for controlling energy supply to a load.

The Embodiment of FIG. 15

Now it will be seen that the SCR turn-off components in the coil operating circuit of this embodiment form a circuit with other applications. Indeed, this circuit could be utilized to control electric current supplied to any load from an energy source. Such a circuit is illustrated in FIG. 15, to which reference now is made.

As seen in FIG. 15, the SCR turn off circuit 280 supplies a load 282 with energy from a first energy source 284, such as a fuel cell or a battery. The load 282 may be virtually any item requiring intermittent energy for operation. The first energy source 284 is connected in series with a second energy source 286. Preferably, both the energy sources 284 and 286 are 12-volt batteries.

The circuit 280 includes an SCR 288 having an anode 290, a cathode 292 and a gate 294. The anode 290 of the SCR 288 is connected to the positive terminal of the first energy source 284, and the cathode 292 is connected or connectable to the input of the load 282. The gate 294 of the SCR 288 is connected to the output of an LED 298. The input of the LED 298 is connected to the output of a signal source of some sort, capable of outputting a pulsed signal "S."

Also included in the circuit 280 for turning off the SCR 288 is a transistor 300 connected in series between the positive terminal of the second energy source 286 and the cathode 292 of the SCR. Thus, the emitter 302 of the transistor 300 is connected to the output of the SCR 288, and the collector 304 is connected to the energy source 286. The base 306 of the transistor 300 is connected to output of a TED 308, and the input of the TED is connected to the signal source "S."

When a pulsed signal "S" is input to the LED 298 and TED 308, the LED detects the leading edge of the signal S and turns on the SCR, which in turn energizes the load 282. When the TED senses the trailing edge of the signal S, it turns on the transistor 300, which in turns provides higher reverse current to the SCR 288, turning off the SCR.

In the SCR turnoff circuit 280 shown in FIG. 15, as well as the coil operating circuits shown in FIG. 14, it will be understood that the circuit components include a pulse transformer between the LED's and SCR's and between the transistors and the TED's. As the use of these pulse transformers is well known and understood, they are not shown in the drawings nor described in detail herein.

SCR's typically are generally known to be easy to turn on, and difficult to turn off. This circuit addresses this problem by providing an efficient and sturdy means for turning an SCR off. Though the transistor typically is not used in high voltage, it is used effectively here because it must tolerate a high voltage for such a short duration.

It is to be understood that the, while the circuits of this invention have been illustrated using a pulsed signal produced by a clock, such as the variable speed clock 128 (FIG. 7) and the fixed power clock 156 (FIG. 8), the invention is not so limited. For example, where the input to the LED's and TED's is an analog signal, a–d converters could be included to provide a pulse input to the detectors. These and other modifications to the circuitry and apparatus are within the intended scope of the present invention.

Now it will be appreciated that the present invention offers many features and advantages. The electric motor of this invention is without brushes, commutators, slip rings, or like components. The drive circuit of the motor of this invention provides for a multiplicity of electromagnet units, each with its own battery or fuel cell. The circuit provides multiple power levels, and rotates the groups of electromagnets in use at each non-maximum power level so that the power drain on the batteries is equally distributed. This greatly extends the operating time for the motor before recharging of any of the batteries is required. Fuel cells are an ideal energy source for this electric motor, since it uses many small coils requiring only low current.

In high voltage systems, with medium to high current (10–1000 amperes), the coils can be switched on using SCR's. The SCR's are turned off using a simple transistor. The transistor is effective and durable even though the system is a high voltage system, because the duration of the voltage supplied to the transistor is so brief. This eliminates the need for more expensive or fragile components, such as capacitors, to turn off the SCR's. This SCR turnoff circuit has far reaching applications beyond electric motors.

Changes can be made in the combination and arrangement of the various parts and elements described herein without departing from the spirit and scope of the invention as defined in the following claims.

What is claimed is:

1. An electric motor comprising:
   a support member;
   a moving member;
   a plurality of electromagnet groups, each group comprising at least one electromagnet set, wherein each electromagnet set comprises a plurality of electromagnet units, wherein each of the electromagnet units comprises at least one coil around a core having two poles, wherein each coil has first and second terminals, wherein the electromagnet units are fixed on the support member and connectable to an energy source, and wherein adjacent electromagnet units are spaced equal distances apart on the support member;
   a plurality of permanent magnets, wherein the permanent magnets are supported on the moving member so that during operation of the motor at least some are positioned a magnetically responsive distance from the plurality of electromagnet units on the support member, wherein each of the permanent magnets has a north pole and a south pole, wherein each of the permanent magnets is alternatingly oriented relative to adjacent permanent magnets so that adjacent poles of adjacent permanent magnets have alternating polarity, and wherein adjacent permanent magnets are spaced equal distances apart on the moving member; and
   a drive circuit comprising:
      a sequencing circuit having a plurality of sequencing outputs adapted to sequentially activate each of the plurality of electromagnet units in each of the electromagnet sets, whereby the moving member is caused to move relative to the support member;

a power control circuit adapted to control the power generated by the motor by activating selected electromagnet groups, wherein the power control circuit has a plurality of incremental power modes comprising a maximum power mode and at least one nonmaximum power mode, wherein in the maximum power mode all the electromagnet groups are activated, and wherein in the at least one nonmaximum power mode a selected number of the electromagnet groups less than all the groups is activated, the power control circuit comprising:

a power selector having a plurality of power mode outputs corresponding to the maximum power mode and the at least one nonmaximum power mode; and a cycling circuit having a plurality of cycling outputs adapted to vary which of the plurality of electromagnet groups are activated by the sequencing circuit when the motor is operating in the at least one nonmaximum power mode without varying the number of groups being activated;

an integration circuit adapted to integrate the sequencing outputs and the cycling outputs to produce a coil control output corresponding to each of the electromagnet units; and a coil operating circuit adapted to control the activation of each electromagnet unit in response to the coil control output.

2. A vehicle comprising the electric motor of claim 1 and further comprising a chassis, and wherein the moving member is movingly supported on the chassis and the support member is fixed to the chassis whereby operation of the electric motor will motivate the vehicle.

3. The electric motor of claim 1 wherein the motor further comprises a frame, and wherein the movable member is an endless belt movably supported on the frame.

4. The electric motor of claim 3 wherein each set of electromagnet units comprises four electromagnet units, wherein each of the electromagnet units comprises a pair of coils wound on the same core whereby the poles of the core are reversible by selectively energizing the pair of coils, and wherein the distance between adjacent permanent magnets is twice the distance between adjacent electromagnet units.

5. The electric motor of claim 4 wherein the endless belt is drivingly supported on pair of wheels including a first wheel and a second wheel, wherein the endless belt has an inner surface and an outer surface, wherein permanent magnets are supported on both the inner surface and the outer surface of the endless belt, wherein the frame comprises an operating area including an upper section through which the endless belt passes above and between the pair of wheels and a lower section through which the endless belt passes below and between the pair of wheels, wherein the support member comprises four trays including a first tray in the upper section of the frame above the endless belt, a second tray in the upper section below the endless belt, a third tray in the lower section above the endless belt, and a fourth tray in the lower section below the endless belt, wherein the plurality of electromagnet groups comprises a first, second, third and fourth group, wherein the first group is supported on the first tray, wherein the second group is supported on the second tray, wherein the third group is supported on the third tray, wherein the fourth group is supported on the fourth tray, wherein each electromagnet set in each group comprises four electromagnet units, so that as the endless belt passes through the operating area of the frame activation of the electromagnet units will propel the permanent magnets on the endless belt thereby rotating the first and second wheels.

6. The electric motor of claim 5 wherein the endless belt comprises a central section and first and second lateral sections on the sides of the central section, wherein the central section is adapted to drivingly engage the first and second wheels, and wherein the first and second lateral sections provide the upper and lower surfaces on which the permanent magnets are supported.

7. The electric motor of claim 1 wherein the distance between adjacent permanent magnets is twice the distance between adjacent electromagnet units.

8. The electric motor of claim 1 wherein the drive circuit comprises a speed control circuit.

9. The electric motor of claim 8 wherein the sequencing circuit comprises a power clock and wherein the speed control circuit comprises means for varying the speed of the pulses emitted from the sequencing circuit power clock.

10. The electric motor of claim 8 wherein the at least one nonmaximum power mode comprises a low power mode, a medium power mode, and a high power mode.

11. The electric motor of claim 10 wherein the power selector comprises a four pole switch comprising a terminal designated for each of the power modes.

12. The electric motor of claim 10 further comprising a direction control circuit adapted to alternate the direction of the sequential activation of the electromagnet units in each set between a forward direction and a reverse direction.

13. The electric motor of claim 12 wherein the direction control circuit comprises a double throw, double pole switch adapted to reverse the order in which the sequencing circuit activates the plurality of electromagnet units in each of the sets of electromagnet units.

14. The electric motor of claim 1 wherein the plurality of electromagnet groups comprises four groups, wherein each group comprises six electromagnet sets, and wherein each set comprises four electromagnet units, and wherein each unit comprises a pair of double wound coils.

15. The electric motor of claim 1 wherein the plurality of groups of electromagnet sets comprises four groups, wherein each group comprises two electromagnet sets, and wherein each set comprises four electromagnet units, and wherein each unit comprises a pair of double wound coils.

16. The electric motor of claim 1 further comprising a direction control circuit adapted to alternate the direction of the sequential activation of the electromagnet units between a forward direction and a reverse direction.

17. The electric motor of claim 16 further comprising a speed control circuit.

18. A vehicle comprising the electric motor of claim 17 and further comprising a chassis, and wherein the moving member is movingly supported on the chassis and the support member is fixed to the chassis whereby operation of the electric motor will motivate the vehicle.

19. The electric motor of claim 1 wherein the sequencing circuit comprises:

a power clock connectable to an energy source and adapted to produce energy pulses;

a counter adapted to receive the energy pulses from the power clock and to produce sequential outputs corresponding to a selected one of the electromagnet units in each electromagnet set;

an matrix of OR gates adapted to receive the sequential outputs of the counter and to sustain the pulse from each sequential output for the duration of two clock pulses; and a time delay circuit adapted to momentarily deactivate each electromagnet unit when it is directly opposite a permanent magnet.

20. The electric motor of claim 19 wherein the power clock in the sequencing circuit is a variable power clock and wherein the electric motor further comprises a speed control circuit comprising means for varying the frequency of the pulses in the variable power clock.

21. A vehicle comprising the electric motor of claim 20 and further comprising a chassis, a wherein the moving member is movingly supported on the chassis and the support member is fixed to the chassis whereby operation of the electric motor will motivate the vehicle.

22. The electric motor of claim 20 wherein means for varying the frequency of the pulses in the variable power clock comprises a variable resistor.

23. The electric motor of claim 1 wherein the power selector is adapted to produce a power mode output and wherein the cycling circuit comprises:
 a power clock connectable to an energy source and adapted to produce energy pulses;
 a counter adapted to receive the energy pulses from the fixed power clock and in response thereto to produce sequential on and off output signals corresponding each electromagnet group; and
 a matrix of AND gates adapted to integrate the power mode output with the on and off output signals from the counter to produce a cycling output for each electromagnet group.

24. A vehicle comprising the electric motor of claim 23 and further comprising a chassis, and wherein the moving member is movingly supported on the chassis and the support member is fixed to the chassis whereby operation of the electric motor will motivate the vehicle.

25. The electric motor of claim 23 wherein the power clock is a fixed power clock.

26. The electric motor of claim 23 wherein the integration circuit comprises a matrix of AND gates adapted to receive the cycling outputs of the cycling circuit and the sequencing outputs and to produce in response thereto a coil control output adapted to control the activation of all the electromagnet units.

27. The electric motor of claim 1 further comprising an energy source.

28. The electric motor of claim 27 wherein the energy source comprises a battery.

29. The electric motor of claim 27 wherein the energy source comprises a plurality of batteries including a battery to supply the drive circuit and a battery for each electromagnet unit.

30. The electric motor of claim 27 wherein the energy source comprises a fuel cell.

31. The electric motor of claim 27 wherein the energy source comprises a plurality of fuel cells including a fuel cell to supply the drive circuit and a fuel cell for each coil in each electromagnet unit.

32. The electric motor of claim 1 wherein the support comprises a stator and wherein the moving member comprises a rotor.

33. The electric motor of claim 32 further comprising a frame and wherein the stator is fixed to the frame and the rotor is rotatably supported on the frame.

34. A vehicle comprising the electric motor of claim 33 and further comprising a chassis, and wherein the moving member is movingly supported on the chassis and the support member is fixed to the chassis whereby operation of the electric motor will motivate the vehicle.

35. The electric motor of claim 33 wherein the permanent magnets on the rotor are supported radially further from the axis of rotation of the rotor than are the electromagnet units on the stator.

36. The electric motor of claim 1 wherein the drive circuit comprises a coil operating circuit for each coil in each electromagnet unit.

37. The electric motor of claim 36 wherein each of the coil operating circuits comprises a MOSFET having an input and first and second outputs, wherein the input is connected to the coil's control output from the integration circuit, wherein the first output is connected to ground, wherein the second output is connected to the first terminal of the coil, and wherein the second terminal of the coil is connectable to an energy source.

38. A vehicle comprising the electric motor of claim 37 and further comprising a chassis, and wherein the moving member is movingly supported on the chassis and the support member is fixed to the chassis whereby operation of the electric motor will motivate the vehicle.

39. The electric motor of claim 37 wherein each of the electromagnet units comprises a pair of coils double wound on the same core.

40. The electric motor of claim 37 wherein the energy source is a battery.

41. The electric motor of claim 37 wherein the energy source is a fuel cell.

42. The electric motor of claim 36 wherein the coil control outputs of the integration comprise electrical pulses, and wherein the first terminal of each of the coils in an electromagnet unit is connectable to a first energy source and the second terminal is connected to logic ground, and wherein each of the coil operating circuits comprises:
 a leading edge detector having an input and an output, the input connected to the coil control output from the integration circuit;
 an SCR connected in series between the first energy source and first terminal of the coil and wherein the gate of the SCR is connected to the output of the leading edge detector;
 a trailing edge detector having an input and an output, the input connected to the coil control output from the integration circuit; and
 a transistor having a base connected to the output of the trailing edge detector, having a collector connectable to a second energy source, and having an emitter connected to the output of the SCR; and
 wherein the first and second energy sources are connectable in series; and
 wherein upon detection by the leading edge detector of the leading edge of the pulse from the integration circuit the leading edge detector turns on the SCR energizing the coil, and so that upon detection by the trailing edge detector of the trailing edge of the pulse the trailing edge detector energizes the transistor, which turns off the SCR thereby de-energizing the coil.

43. A vehicle comprising the electric motor of claim 42 and further comprising a chassis, and wherein the moving member is movingly supported on the chassis and the support member is fixed to the chassis whereby operation of the electric motor will motivate the vehicle.

44. The electric motor of claim 42 wherein the first and second energy sources are batteries.

45. The electric motor of claim 42 wherein the first and second energy sources are fuel cells.

46. An electric motor comprising:
- a support member;
- a moving member;
- a plurality of electromagnet groups, each group comprising at least one electromagnet set, wherein each electromagnet set comprises a plurality of electromagnet units, wherein each of the electromagnet units comprises at least one coil around a core having two poles, wherein each coil has first and second terminals, wherein the electromagnet units are fixed on the support member and connectable to a energy source, and wherein adjacent electromagnet units are spaced equal distances apart on the support member, wherein the number of electromagnet units is a factor of 360;
- a plurality of permanent magnets, wherein the permanent magnets are supported on the moving member so that during operation of the motor at least some are positioned a magnetically responsive distance from the plurality of electromagnet units on the support member, wherein each of the permanent magnets has a north pole and a south pole, wherein each of the permanent magnets is alternatingly oriented relative to adjacent permanent magnets so that adjacent poles of adjacent permanent magnets have alternating polarity, wherein adjacent permanent magnets are spaced equal distances apart on the moving member, and wherein the number of permanent magnets is an even number; and
- a drive circuit comprising:
  - a sequencing circuit having a plurality of sequencing outputs adapted to sequentially activate each of the plurality of electromagnet units in each of the sets of electromagnet units, whereby the moving member is caused to move relative to the support member;
  - a power control circuit adapted to control the power generated by the motor by activating selected electromagnet groups, wherein the power control circuit has a plurality of incremental power modes comprising a maximum power mode and at least one nonmaximum power mode, wherein in the maximum power mode all the electromagnet groups are activated, and wherein in the at least one nonmaximum power mode a selected number of the electromagnet groups less than all the groups is activated, the power control circuit comprising:
    - a power selector having a plurality of power mode outputs corresponding to the maximum power mode and the at least one nonmaximum power mode; and
    - a cycling circuit having a plurality of sequential cycling outputs adapted to vary which of the plurality of electromagnet groups are activated by the sequencing circuit when the motor is operating in the at least one nonmaximum power mode without varying the number of groups being activated;
  - an integration circuit adapted to integrate the sequencing outputs and the cycling outputs to produce a coil control output corresponding to each of the electromagnet units; and
  - a coil operating circuit adapted to control the activation of each electromagnet unit in response to the coil control output.

47. A vehicle comprising the electric motor of claim 46 and further comprising a chassis, and wherein the moving member is movingly supported on the chassis and the support member is fixed to the chassis whereby operation of the electric motor will motivate the vehicle.

48. The electric motor of claim 46 wherein the motor further comprises a frame, and wherein the movable member is an endless belt movably supported on the frame.

49. The electric motor of claim 48 wherein each set of electromagnet units comprises four electromagnet units, wherein each of the electromagnet units comprises a pair of coils wound on the same core whereby the poles of the core are reversible by selectively energizing the pair of coils, and wherein the distance between adjacent permanent magnets is twice the distance between adjacent electromagnet units.

50. The electric motor of claim 49 wherein the endless belt is drivingly supported on pair of wheels including a first wheel and a second wheel, wherein the endless belt has an inner surface and an outer surface, wherein permanent magnets are supported on both the inner surface and the outer surface of the endless belt, wherein the frame comprises an operating area including an upper section through which the endless belt passes above and between the pair of wheels and a lower section through which the endless belt passes below and between the pair of wheels, wherein the support member comprises four trays including a first tray in the upper section of the frame above the endless belt, a second tray in the upper section below the endless belt, a third tray in the lower section above the endless belt, and a fourth tray in the lower section below the endless belt, wherein the plurality of electromagnet groups comprises a first, second, third and fourth group, wherein the first group is supported on the first tray, wherein the second group is supported on the second tray, wherein the third group is supported on the third tray, wherein the fourth group is supported on the fourth tray, wherein each electromagnet set in each group comprises four electromagnet units, so that as the endless belt passes through the operating area of the frame activation of the electromagnet units will propel the permanent magnets on the endless belt thereby rotating the first and second wheels.

51. The electric motor of claim 50 wherein the endless belt comprises a central section and first and second lateral sections on the sides of the central section, wherein the central section is adapted to drivingly engage the first and second wheels, and wherein the first and second lateral sections provide the upper and lower surfaces on which the permanent magnets are supported.

52. The electric motor of claim 46 wherein the distance between adjacent permanent magnets is twice the distance between adjacent electromagnet units.

53. The electric motor of claim 46 wherein the drive circuit comprises a speed control circuit.

54. The electric motor of claim 53 wherein the sequencing circuit comprises a power clock and wherein the speed control circuit comprises means for varying the frequency of the pulses emitted from the sequencing circuit power clock.

55. The electric motor of claim 53 wherein the at least one nonmaximum power mode comprises a low power mode, a medium power mode, and a high power mode.

56. The electric motor of claim 55 herein the power selector comprises a four pole switch comprising a terminal designated for each of the power modes.

57. The electric motor of claim 55 further comprising a direction control circuit adapted to alternate the direction of the sequential activation of the electromagnet units in each set between a forward direction and a reverse direction.

58. The electric motor of claim 57 wherein the direction control circuit comprises a double throw, double pole switch adapted to reverse the order in which the sequencing circuit activates the plurality of electromagnet units in each of the sets of electromagnet units.

59. The electric motor of claim 46 wherein the plurality of electromagnet groups comprises four groups, wherein each group comprises six electromagnet sets, and wherein each set comprises four electromagnet units, and wherein each unit comprises a pair of double wound coils.

60. The electric motor of claim 46 wherein the plurality of groups of electromagnet sets comprises four groups, wherein each group comprises two electromagnet sets, and wherein each set comprises four electromagnet units, and wherein each unit comprises a pair of double wound coils.

61. The electric motor of claim 46 further comprising a direction control circuit adapted to alternate the direction of the sequential activation of the electromagnet units between a forward direction and a reverse direction.

62. The electric motor of claim 61 further comprising a speed control circuit.

63. A vehicle comprising the electric motor of claim 62 and further comprising a chassis, and wherein the moving member is movingly supported on the chassis and the support member is fixed to the chassis whereby operation of the electric motor will motivate the vehicle.

64. The electric motor of claim 46 wherein the sequencing circuit comprises:
   a power clock connectable to an energy source and adapted to produce energy pulses;
   a counter adapted to receive the energy pulses from the power clock and to produce sequential outputs corresponding to a selected one of the electromagnet units in each electromagnet set;
   a matrix of OR gates adapted to receive the sequential outputs of the counter and to sustain the pulse from each sequential output for the duration of two clock pulses; and
   a time delay circuit adapted to momentarily deactivate each electromagnet unit when it is directly opposite a permanent magnet.

65. The electric motor of claim 64 wherein the power clock in the sequencing circuit is a variable power clock and wherein the electric motor further comprises a speed control circuit comprising means for varying the frequency of the pulses in the variable power clock.

66. A vehicle comprising the electric motor of claim 65 and further comprising a chassis, and wherein the moving member is movingly supported on the chassis and the support member is fixed to the chassis whereby operation of the electric motor will motivate the vehicle.

67. The electric motor of claim 65 wherein means for varying the frequency of the pulses in the variable power clock comprises a variable resistor.

68. The electric motor of claim 46 wherein the power selector is adapted to produce a power mode output and wherein the cycling circuit comprises:
   a power clock connectable to an energy source and adapted to produce energy pulses;
   a counter adapted to receive the energy pulses from the fixed power clock and in response thereto to produce sequential on and off output signals corresponding each electromagnet group; and
   a matrix of AND gates adapted to integrate the power mode output with the on and off output signals from the counter to produce a cycling output for each electromagnet group.

69. A vehicle comprising the electric motor of claim 68 and further comprising a chassis, and wherein the moving member is movingly supported on the chassis and the support member is fixed to the chassis whereby operation of the electric motor will motivate the vehicle.

70. The electric motor of claim 68 wherein the power clock is a fixed power clock.

71. The electric motor of claim 68 wherein integration circuit comprises a matrix of AND gates adapted to receive the cycling outputs of the cycling circuit and the sequencing outputs and to produce in response thereto a coil control output adapted to control the activation of all the electromagnet units.

72. The electric motor of claim 46 further comprising an energy source.

73. The electric motor of claim 46 wherein the energy source comprises a battery.

74. The electric motor of claim 72 wherein the energy source comprises a plurality of batteries including a battery to supply the drive circuit and a battery for each electromagnet unit.

75. The electric motor of claim 72 wherein the energy source comprises a fuel cell.

76. The electric motor of claim 72 wherein the energy source comprises a plurality of fuel cells including a fuel cell to supply the drive circuit and a fuel cell for each electromagnet unit.

77. The electric motor of claim 46 wherein the support comprises a stator and wherein the moving member comprises a rotor.

78. The electric motor of claim 77 further comprising a frame and wherein the stator is fixed to the frame and the rotor is rotatably supported on the frame.

79. A vehicle comprising the electric motor of claim 78 and further comprising a chassis, and wherein the moving member is movingly supported on the chassis and the support member is fixed to the chassis whereby operation of the electric motor will motivate the vehicle.

80. The electric motor of claim 78 wherein the permanent magnets on the rotor are supported radially further from the axis of rotation of the rotor than are the electromagnet units on the stator.

81. The electric motor of claim 46 wherein the drive circuit comprises a coil operating circuit for each coil in each electromagnet unit.

82. The electric motor of claim 81 wherein each of the coil operating circuits comprises a MOSFET having an input and first and second outputs, wherein the input is connected to the coil's control output from the integration circuit, wherein the first output is connected to ground, wherein the second output is connected to the first terminal of the coil, and wherein the second terminal of the coil is connectable to an energy source.

83. A vehicle comprising the electric motor of claim 82 and further comprising a chassis, and wherein the moving member is movingly supported on the chassis and the support member is fixed to the chassis whereby operation of the electric motor will motivate the vehicle.

84. The electric motor of claim 82 wherein each of the electromagnet units comprises a pair of coils double wound on the same core.

85. The electric motor of claim 82 wherein the energy source is a battery.

86. The electric motor of claim 82 wherein the energy source is a fuel cell.

87. The electric motor of claim 81 wherein the coil control outputs of the integration circuit comprise electrical pulses, and wherein the first terminal of each of the coils in a electromagnet unit is connectable to a first energy source and the second terminal is connected to ground, and wherein each of the coil operating circuits comprises:
   a leading edge detector having an input and an output, the input connected to the coil control output from the integration circuit;

an SCR connected in series between the first energy source and first terminal of the coil and wherein the gate of the SCR is connected to the output of the leading edge detector;

a trailing edge detector having an input and an output, the input connected to the coil control output from the integration circuit; and a transistor having a base connected to the output of the trailing edge detector, having a collector connectable to a second energy source, and having an emitter connected to the output of the SCR; and wherein the first and second energy sources are connectable in series; and wherein upon detection by the leading edge detector of the leading edge of the pulse from the integration circuit the leading edge detector turns on the SCR energizing the coil, and so that upon detection by the trailing edge detector of the trailing edge of the pulse the trailing edge detector energizes the transistor which turns off the SCR thereby de-energizing the coil.

88. A vehicle comprising the electric motor of claim 87 and further comprising a chassis, and wherein the moving member is movingly supported on the chassis and the support member is fixed to the chassis whereby operation of the electric motor will motivate the vehicle.

89. The electric motor of claim 87 wherein the first and second energy sources are batteries.

90. The electric motor of claim 87 wherein the first and second energy sources are fuel cells.

* * * * *